(12) United States Patent
Sugai et al.

(10) Patent No.: US 12,166,576 B2
(45) Date of Patent: Dec. 10, 2024

(54) INFORMATION PROCESSING DEVICE AND INFORMATION PROCESSING METHOD

(71) Applicant: SONY GROUP CORPORATION, Tokyo (JP)

(72) Inventors: Ren Sugai, Tokyo (JP); Ryota Kimura, Tokyo (JP); Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/042,333

(22) PCT Filed: Aug. 12, 2021

(86) PCT No.: PCT/JP2021/029733
§ 371 (c)(1),
(2) Date: Feb. 21, 2023

(87) PCT Pub. No.: WO2022/050018
PCT Pub. Date: Mar. 10, 2022

(65) Prior Publication Data
US 2023/0327801 A1 Oct. 12, 2023

(30) Foreign Application Priority Data
Sep. 2, 2020 (JP) .................... 2020-147866

(51) Int. Cl.
*H04L 1/00* (2006.01)
*H04L 1/08* (2006.01)
(52) U.S. Cl.
CPC .............. *H04L 1/0057* (2013.01); *H04L 1/08* (2013.01)

(58) Field of Classification Search
CPC ....... H04L 1/0057; H04L 1/08; H04L 1/0041; H04L 1/0045; H04L 1/0065;
(Continued)

(56) References Cited

U.S. PATENT DOCUMENTS 9,391,754 B2 * 7/2016 Nammi ................ H04L 1/1671
9,929,833 B2 * 3/2018 Park .................... H04W 72/0446
(Continued)

FOREIGN PATENT DOCUMENTS

JP 2012-004952 A 1/2012
JP 2017-038261 A 2/2017
(Continued)

OTHER PUBLICATIONS

International Search Report and Written Opinion of PCT Application No. PCT/JP2021/029733, issued on Nov. 2, 2021, 09 pages of ISRWO.

(Continued)

*Primary Examiner* — Albert Decady
*Assistant Examiner* — Osman M Alshack
(74) *Attorney, Agent, or Firm* — CHIP LAW GROUP

(57) ABSTRACT

Provided is an information processing device which includes a processing unit that transmits information requesting retransmission in a coding unit of a first code processed in a second protocol layer higher than a first protocol layer that performs processing related to a second code, and performs decoding of the first code on a basis of an encoded symbol of the first code obtained by decoding of the second code.

19 Claims, 18 Drawing Sheets

(58) Field of Classification Search
CPC ... H04L 1/1819; H04L 1/1854; H04L 1/1887; H04L 1/1671
USPC .................................................. 714/748–750
See application file for complete search history.

(56) References Cited

U.S. PATENT DOCUMENTS

| | | | |
|---|---|---|---|
| 2009/0257372 | A1 | 10/2009 | Chin |
| 2016/0373915 | A1* | 12/2016 | Kim ...................... H04W 76/14 |
| 2017/0142704 | A1* | 5/2017 | Jung ....................... H04L 5/001 |
| 2017/0374651 | A1* | 12/2017 | Klingenbrunn ....... H04L 1/1812 |
| 2018/0205503 | A1* | 7/2018 | Chen .................. H04W 52/346 |
| 2018/0212714 | A1* | 7/2018 | Mori .................... H04L 69/324 |
| 2019/0069341 | A1* | 2/2019 | Jia ......................... H04L 1/0041 |
| 2020/0059327 | A1* | 2/2020 | Kini ...................... H04L 1/1864 |
| 2020/0195386 | A1* | 6/2020 | Marinier ............... H04L 1/1854 |
| 2021/0028893 | A1* | 1/2021 | Hwang ................. H04L 1/1896 |
| 2021/0203450 | A1* | 7/2021 | Xu ........................ H04L 1/1896 |

FOREIGN PATENT DOCUMENTS

| | | |
|---|---|---|
| JP | 2018-157333 A | 10/2018 |
| WO | 2020/166230 A1 | 8/2020 |

OTHER PUBLICATIONS

"Multiplexing and channel coding", 3rd Generation Partnership Project (3GPP), Technical Specification Group Radio Access Network, 3GPP TS 38.212, Version 15.7.0, Release 15, Sep. 2019, 108 pages.
Imran Latif et al., "HARQ Framing", IEEE; 802.11-19-0873-01-00BE-HARQ-FRAMING, IEEE—SA Mentor, Piscataway, NJ USA vol. 802.11 EHT; 802.11be, No. 1 Jul. 17, 2019 (Jul. 17, 2019), pp. 1-20, XP068153170.

* cited by examiner

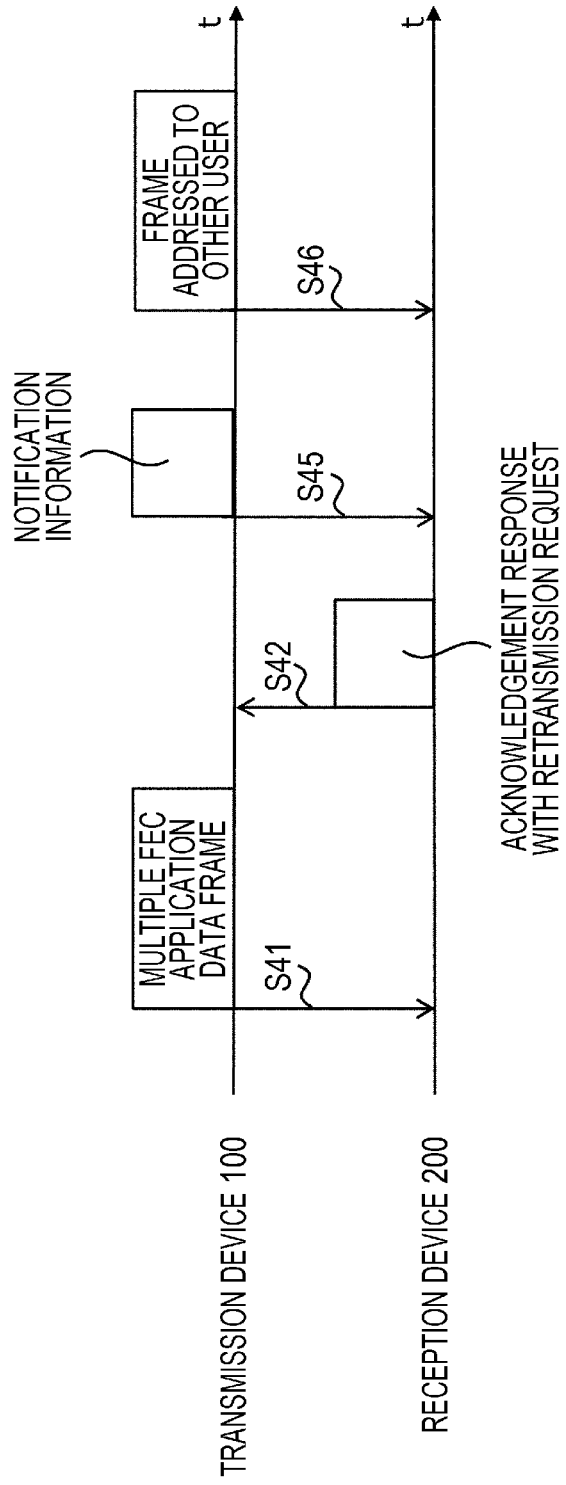

PART OF RADIO RESOURCES OF OTHER USERS

PADDING

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/029733 filed on Aug. 12, 2021, which claims priority benefit of Japanese Patent Application No. JP 2020-147866 filed in the Japan Patent Office on Sep. 2, 2020. Each of the above-referenced applications is hereby incorporated herein by reference in its entirety.

TECHNICAL FIELD

The present disclosure relates to an information processing device and an information processing method.

BACKGROUND ART

Wireless access schemes and wireless networks for cellular mobile communication (hereinafter, also referred to as "Long Term Evolution (LTE)", "LTE-Advanced (LTE-A)", "LTE-Advanced Pro (LTE-A Pro)", "Evolved Universal Terrestrial Radio Access (EUTRA)", "New Radio (NR)", "New Radio Access Technology (NRAT)", or "Further EUTRA (FEUTRA)") are under review in the 3rd Generation Partnership Project (3GPP). Note that, in the following description, LTE includes LTE-A, LTE-A Pro, and EUTRA, and NR includes NRAT and FEUTRA.

In LTE, a base station device (base station) is also referred to as an evolved NodeB (eNodeB), and in NR, a base station device (base station) is also referred to as a gNodeB. In LTE and NR, a terminal device (mobile station, mobile station device, or terminal) is also referred to as user equipment (UE).

LTE and NR are cellular communication systems in which a plurality of areas covered by base stations is arranged in cell shapes. A single base station may manage multiple cells. In the NR, in addition to an enhanced mobile broadband (eMBB) of conventional data communication of smartphones, it is assumed that one wireless system supports various communication use cases such as ultra-reliable and low latency communication (URLLC)) or the like, which requires high reliability and low latency, such as emergency message transmission used for automated driving or the like.

In URLLC in which a low latency requirement is high, a latency caused by retransmission is one of problems. Non-Patent Document 1 discloses an error correction code related technique studied in NR.

It is necessary to reduce occurrence of retransmission and to shorten a retransmission time even in a case where retransmission occurs.

CITATION LIST

Non-Patent Document

Non Patent Document 1: 3GPP TS 38.212 V15.7.0 (2019-09), "Multiplexing and channel coding (Release 15)"

SUMMARY OF THE INVENTION

Problems to be Solved by the Invention

The present disclosure provides an information processing device and an information processing method capable of shortening a retransmission time.

Solutions to Problems

An information processing device of the present disclosure includes a processing unit that transmits information requesting retransmission in a coding unit of a first code processed in a second protocol layer higher than a first protocol layer that performs processing related to a second code.

An information processing method of the present disclosure transmits information requesting retransmission in a coding unit of a first code processed in a second protocol layer higher than a first protocol layer that performs processing related to a second code.

BRIEF DESCRIPTION OF DRAWINGS

FIG. 17 is a diagram illustrating a sequence example of operations between the transmission device and the reception device according to a second modification.

MODE FOR CARRYING OUT THE INVENTION

Hereinafter, embodiments of the present disclosure will be described with reference to the drawings.

[Configuration of Communication Network]

Figure 1:
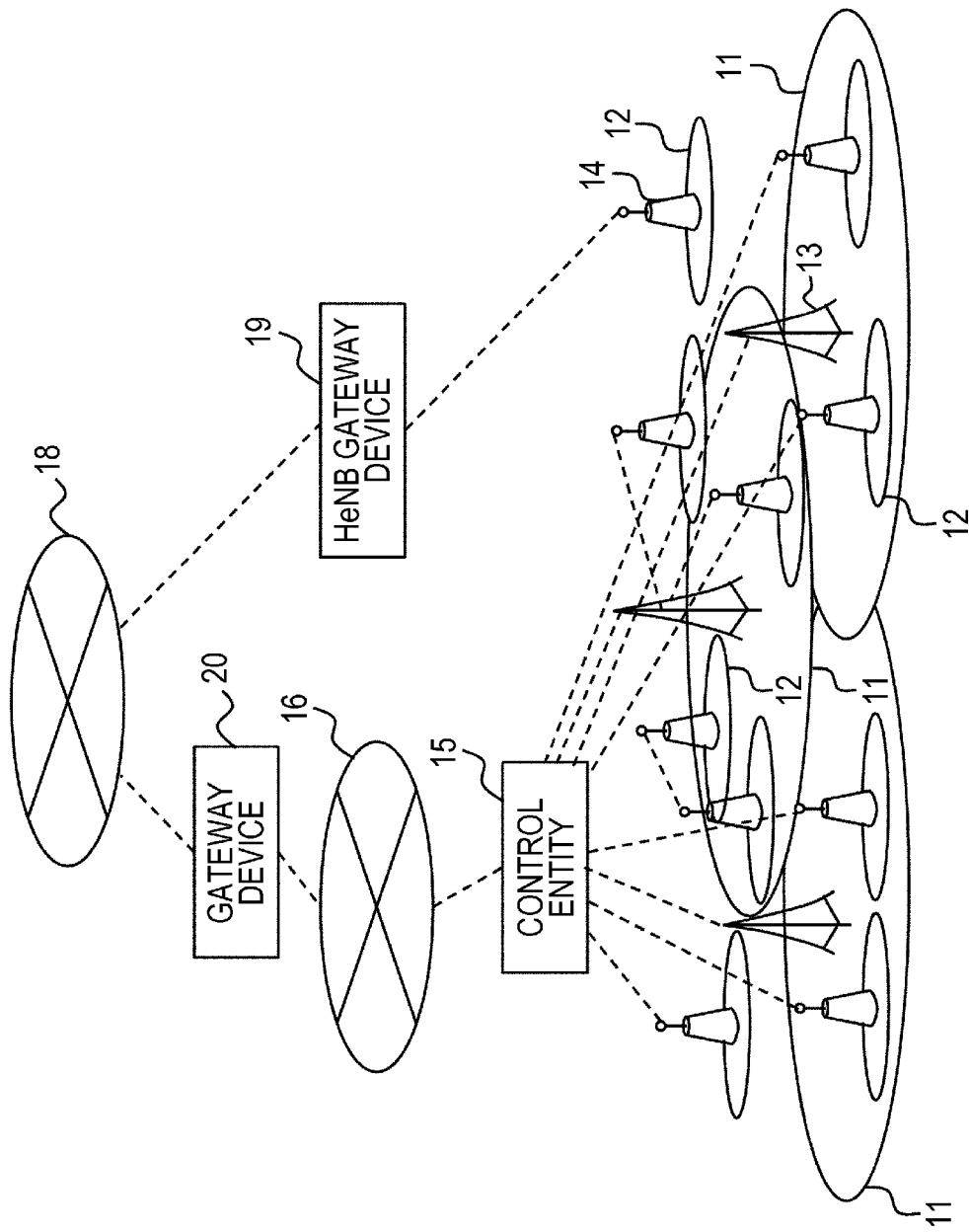
FIG. 1 is a diagram illustrating a configuration example of a communication network according to the present embodiment.

FIG. 1 illustrates a configuration example of a communication network according to the present embodiment. In FIG. 1, the propagation channels (lines) are indicated by broken lines. A line means a logical connection, and is not necessarily directly connected physically.

As a plurality of base stations, a macro cell base station 13 that provides a macro cell 11 and a small cell base station 14 that provides a small cell 12 smaller than the macro cell are arranged. In a case of being referred to as a base station, the base station may be either the macro cell base station 13 or the small cell base station 14. The macro cell 11 and the small cell 12 are communication areas (cells) in which each of a plurality of base stations provides services, and are indicated by ellipses in FIG. 1. One base station may provide a plurality of cells.

The base stations can communicate with each other via a backhaul (here, wired or wireless), and mainly exchange control information. In this backhaul, for example, information may be exchanged using a protocol of the X2 interface or the S1 interface. The topology of the backhaul between the base stations may be any type such as a mesh type, a star type, a ring type, or the like.

The base stations also have a backhaul with the core network. The base stations may be connected to a core network 16 by being connected to a control entity 15 (the control entity 15 may be regarded as one element of the core network 16). There may be a plurality of control entities 15.

Furthermore, the base stations may be connected to the core network 16 via an external network 18 in addition to via the control entity 15. Examples of such an external network 18 include a femto cell base station, a home eNodeB (HeNB) device, or the like that can be installed indoors or at home. One or more small cell base stations 14 are connected to the external network 18 via a HeNB gateway device 19. The external network 18 is connected to the core network 16 via a gateway device 20.

The small cell 12 is basically disposed so as to overlap with the macro cell 11. However, the small cell 12 may be disposed so as to partially overlap with the macro cell 11, or may be disposed completely outside the macro cell 11. A plurality of small cell base stations 14 may form a group (cluster). In the cluster, a base station having a role of a cluster head may be provided.

The radio resources (at least one of a frequency resource, a time resource, or a spatial resource) used in the macro cell 11 and the small cell 12 may have characteristics. For example, a same frequency resource F1 (or time resource T1) may be used by the macro cell 11 and the small cell 12. In this way, it is possible to improve the utilization efficiency of the radio resources as the entire system.

The macro cell 11 may use a frequency resource F1 (or a time resource T1), and the small cell 12 may use a frequency resource F2 (or a time resource T2). In this way, interference between the macro cell 11 and the small cell 12 can be avoided.

Further, both the frequency resources F1 and F2 (both the time resources T1 and T2) may be used by each of the macro cell 11 and the small cell 12. A method in which both the frequency resources F1 and F2 are used by each of the macro cell 11 and the small cell 12 is similar in concept to carrier aggregation (CA).

[Configuration of Transmission Device and Reception Device]

In the present embodiment, on the transmission side, a plurality of error correction codes (FEC) is used to perform stepwise encoding on an information sequence to be transmitted. Specifically, as an example, for an information sequence, first FEC encoding is performed first using an erasure correction code that is a first code in a data link layer (second protocol layer), and second FEC encoding is performed second using a second code in a physical layer (first protocol layer) lower than the data link layer. In addition, the reception side acquires an information sequence by performing decoding on data received from the transmission side in a stepwise manner by a decoding scheme corresponding to each of a plurality of FECs. Specifically, decoding of the second FEC is performed first in the physical layer (first protocol layer), and decoding of the first FEC is performed second in the data link layer (second protocol layer).

Figure 2:
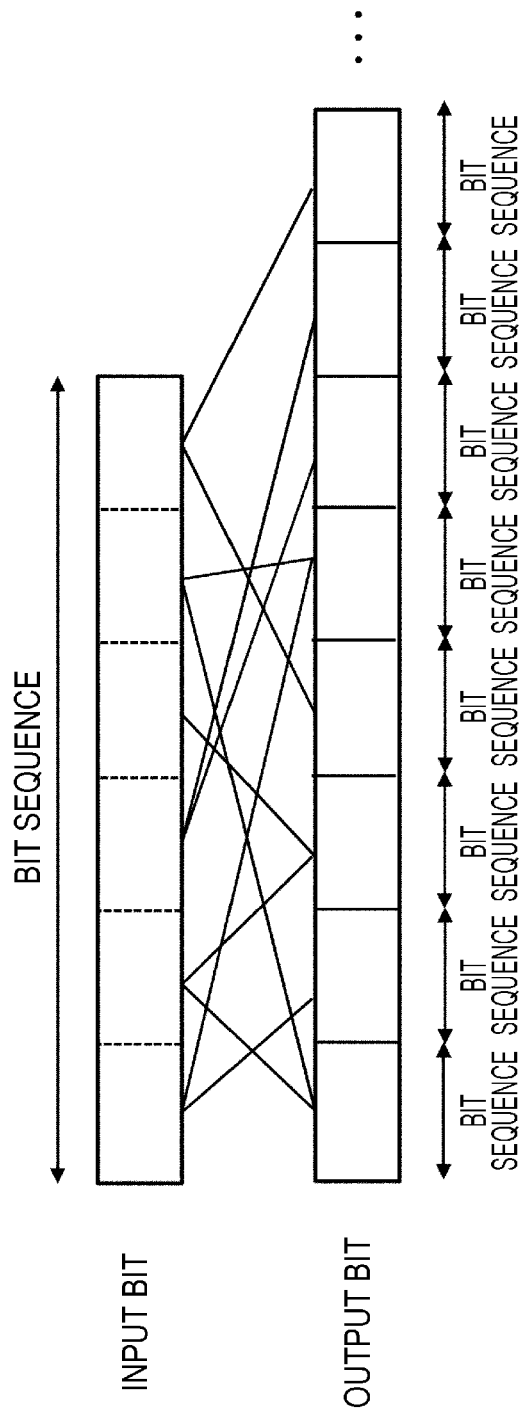
FIG. 2 is a diagram schematically illustrating encoding of a first FEC.

FIG. 2 is a diagram schematically illustrating encoding of the first FEC. In the encoding of the first FEC, one or a plurality of bit sequences to be output is generated from one input bit sequence. The plurality of generated bit sequences can be divided into two, that is, a bit sequence that needs to be transmitted to the reception side and a bit sequence that can be decoded at the reception side without being transmitted to the reception side. That is, even if the reception side does not receive all of the plurality of bit sequences, the original bit sequence to be an input can be restored.

The bit sequence input in FIG. 2 is represented by a plurality of rectangles, and each rectangle includes one or more bits. The plurality of output bit sequences is each indicated by one rectangle, and each bit sequence corresponds to an encoded symbol including one or more bits. Each bit sequence (encoded symbol) is generated on the basis of bits corresponding to one or more rectangles on the input side. The relationship between each bit sequence and the bits on the input side from which each bit sequence is generated is represented by straight lines connecting the rectangles on the input side and the rectangles on the output side.

An erasure correction code (erasure code) can be used as the code (first code) of the first FEC. Examples of the erasure correction code include an FEC method belonging to a category such as rateless codes, fountain codes, or the like, an FEC method of performing linear synthesis or XOR synthesis on a plurality of bit sequences to encode the bit sequences, or the like. Specific examples of the erasure correction code include rateless codes, fountain codes, Tornado codes, Luby transform (LT) codes, Raptor codes, RaptorQ codes, LDPC codes, BCH codes, RS codes, Zigzag decodable codes, ZD fountain codes, XOR codes, or the like.

Figure 3:
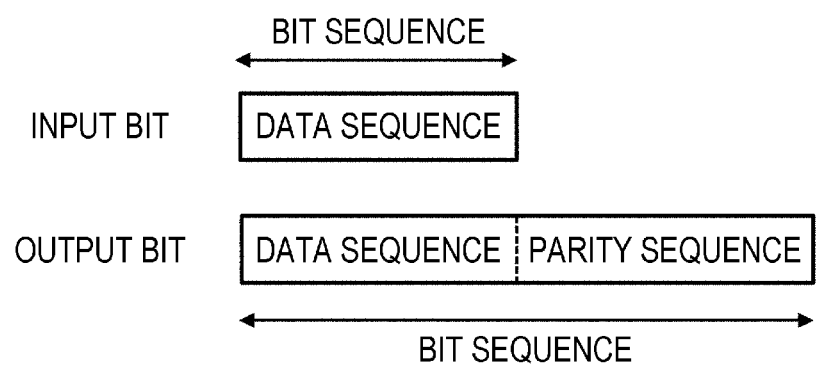
FIG. 3 is a diagram schematically illustrating encoding of a second FEC.

FIG. 3 is a diagram schematically illustrating encoding of the second FEC. In the encoding of the second FEC, one bit sequence to be output is generated from one input bit sequence. In the example of FIG. 3, the output bit string is generated by adding a parity sequence to the input bit sequence.

The code (second code) used for the second FEC include convolutional codes, turbo codes, low density parity check codes (LDPC codes), polar codes, or the like. However, the use of the erasure correction code as the code used for the second FEC is also not excluded.

Figure 4:
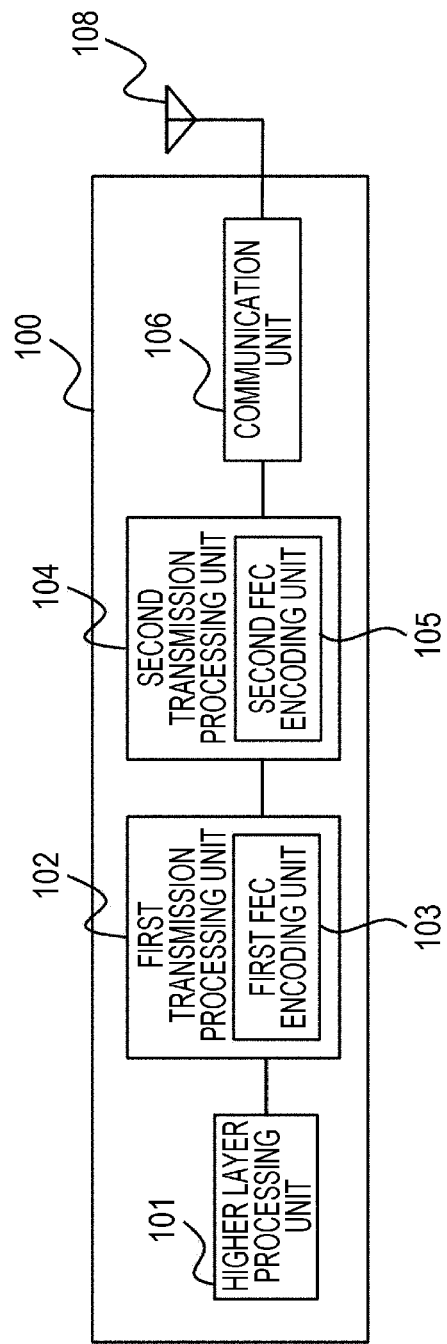
FIG. 4 is a block diagram schematically illustrating an example of a transmission device according to the present embodiment.

FIG. 4 is a block diagram schematically illustrating an example of a transmission device 100 according to the present embodiment. The transmission device 100 includes a higher layer processing unit 101, a first transmission processing unit 102, a second transmission processing unit 104, a communication unit 106, and an antenna 108. In the present embodiment, the transmission device 100 performs wireless communication, but a configuration for performing wired communication is also not excluded. In this case, the antenna 108 may not be provided.

The higher layer processing unit 101 performs processing related to a higher layer. The higher layer includes, for example, an application layer, a session layer, a presentation layer, a transport layer, and a network layer. The higher layer processing unit 101 executes an application, for example, and generates data to be transmitted to the reception device. The higher layer processing unit 101 provides the generated data to the first transmission processing unit 102. The higher layer processing unit 101 may provide additional information such as quality of service (QoS) information or the like to the first transmission processing unit 102 together with data. The quality of service information includes information such as, for example, an allowed transmission latency, a transmission bandwidth, a priority of data, an application type, or the like.

The first transmission processing unit 102 performs processing related to a data link layer. The data link layer corresponds to the second protocol layer as an example. Note that a part of processing of the data link layer may be performed by the higher layer processing unit 101. Alternatively, a part of processing of the higher layer may be performed by the first transmission processing unit 102. The first transmission processing unit 102 acquires the data provided from the higher layer processing unit 101 as the input bit sequence (information sequence to be transmitted and received) described in FIG. 2. The first transmission processing unit 102 includes a first FEC encoding unit 103 that performs encoding of the first FEC.

The first FEC encoding unit 103 generates coded data (coded data of the first FEC) by encoding the data input from the higher layer processing unit 101 with an erasure correction code that is a first code. The coded data is provided to the second transmission processing unit 104 that performs processing of the first protocol layer (physical layer) lower than the second protocol layer.

As an example, the first FEC encoding unit 103 divides the input data into a plurality of symbols by a symbol size (symbol size of the first FEC) that is a unit for encoding. Then, a plurality of pieces of coded data (encoded symbols) is generated by encoding a plurality of symbols by the erasure correction code. The first FEC encoding unit 103 may add error detection information to each of the plurality of pieces of coded data. Examples of the error detection information include cyclic redundancy check (CRC, hereinafter CRC), syndrome, frame check sequence (FCS), and the like. The first transmission processing unit 102 provides the plurality of pieces of coded data to the second transmission processing unit 104. Alternatively, the first transmission processing unit 102 generates data in the format of the second protocol layer on the basis of the plurality of pieces of coded data, and provides the generated data to the second transmission processing unit 104.

As an example, in the case of the 3GPP standard, when the coded data matches the length to which the encoding of the second FEC is applied, the coded data may be provided as it is as data for generating a code block. In a case where the coded data is longer than the length to which the encoding of the second FEC is applied, the coded data may be divided into two or more fragments, and each fragment may be provided as data for code block generation. In a case where the coded data is shorter than the length to which the encoding of the second FEC is applied, all or a part of the coded data may be concatenated between different pieces of coded data, and data obtained by the concatenation may be provided as data for code block generation. Data (data for code block generation) having a length to which the encoding of the second FEC is applied may be acquired by combining division and concatenation. The operation in the case of the 3GPP standard described here is an example.

As another example, in the case of the IEEE 802.11 standard, one or a plurality of medium access control (MAC) frames may be generated on the basis of a plurality of pieces of coded data, and the MAC frame may be provided to the second transmission processing unit 104. The MAC frame may be a MAC protocol data unit (MPDU) or an aggregated MPDU (A-MPDU). A MAC frame includes, for example, a MAC header, a frame body field, and an FCS. Main body data is stored in the frame body field. The main body data is generated on the basis of the coded data. The MAC frame may include one or more pieces of coded data. The coded data may be divided into two or more fragments to generate a MAC frame including a fragment. Two or more pieces of coded data may be concatenated as the main body data of the MAC frame. The main body data of the MAC frame may be generated by combining division and concatenation. Padding data may be added to the end of the MAC frame, and a service field may be added to the head. The operation in the case of the IEEE 802.11 standard described here is an example.

The first transmission processing unit 102 may decide at least one of the number of symbols or the symbol length to which the first FEC is applied on the basis of priority of data to be transmitted or information of an application. The priority of data or the information of the application is associated with at least one of the number of symbols or the symbol length to which the first FEC is applied in advance by association information such as a table or the like. At least one of the number of symbols or the symbol length is decided with reference to the table on the basis of the priority of data or the information of the application provided from the higher layer processing unit 101. The symbol size of the first FEC is decided on the basis of at least one of the decided number of symbols or the decided symbol length, and the input data is divided with the decided symbol size.

The first transmission processing unit 102 may decide at least one of the number of symbols or the symbol length to which the first FEC is applied on the basis of the quality information of the communication path between the transmission device 100 and a reception device 200. The communication quality may be, for example, the number of times of retransmission of data or coded data, an error rate of packets, a communication speed, a SINR, an RSSI, a latency request, a reliability request, or the like. As an example, the information of the communication quality is associated with at least one of the number of symbols or the symbol length to which the first FEC is applied in advance by association information such as a table or the like. At least one of the number of symbols or the symbol length to which the first FEC is applied is decided with reference to the table on the basis of the information of the measured communication quality. The symbol size of the first FEC is decided on the basis of at least one of the decided number of symbols or the decided symbol length, and data to be transmitted is divided with the decided symbol size. The measurement of the communication quality may be performed by the first transmission processing unit 102, the higher layer processing unit 101, the second transmission processing unit 104, or the communication unit 106.

The first transmission processing unit 102 may decide at least one of the number of symbols or the symbol length to which the first FEC is applied on the basis of the modulation scheme used for transmission by the communication unit 106, the coding rate of the second code, the coding rate of the first code, or a combination thereof. The modulation scheme, the coding rate of the second code, the coding rate of the first code, or a combination thereof is associated with, for example, at least one of the number of symbols or the symbol length to which the first FEC is applied in advance by association information such as a table or the like. At least one of the number of symbols or the symbol length to which the first FEC is applied is decided with reference to the table on the basis of the modulation scheme, the coding rate of the second code, the coding rate of the first code, or a combination thereof used in the communication unit 106. The symbol size of the first FEC is decided on the basis of at least one of the decided number of symbols or the decided symbol length, and data to be transmitted is divided with the decided symbol size. The modulation scheme, the coding rate of the second code, the coding rate of the first code, or a combination thereof may be decided by either the first transmission processing unit 102 or the second transmission processing unit 104.

The second transmission processing unit 104 performs processing related to the physical layer. The physical layer corresponds to the first protocol layer as an example. Note that a part of the processing of the physical layer may be performed by the first transmission processing unit 102. Alternatively, a part of the processing of the data link layer may be performed by the second transmission processing unit 104. The second transmission processing unit 104 includes a second FEC encoding unit 105. The second FEC encoding unit 105 encodes data including the coded data provided from the first transmission processing unit 102 using a second code. The second transmission processing unit 104 generates data to be transmitted to the reception device 200 on the basis of the data encoded with the second code. The second transmission processing unit 104 provides the generated data to the communication unit 106 as a data frame (transmission frame).

As an example, in the case of the 3GPP standard, the second FEC encoding unit 105 generates code blocks by performing encoding with the second code on the basis of the data provided from the first transmission processing unit 102. The second transmission processing unit 104 concatenates a plurality of code blocks into a transport block, and adds a CRC, which is error detection information, to the end of the transport block. If necessary, padding data is added after the CRC. The data after the padding data addition is provided to the communication unit 106 as a data frame. A header may be added to the head of the transport block. The operation in the case of the 3GPP standard described here is an example.

As another example, in the case of the IEEE 802.11 standard, the second FEC encoding unit 105 performs encoding with the second code on the basis of the MAC frame (MPDU or A-MPDU) provided from the first transmission processing unit 102. A service field and padding data may be added to the MAC frame. The second transmission processing unit 104 adds a physical header (PHY Header) which is a header of the physical layer to the encoded MAC frame to form a data frame of the physical layer, and provides the data frame of the physical layer to the communication unit 106. The operation in the case of the IEEE 802.11 standard described here is an example.

The communication unit 106 transmits the data provided from the second transmission processing unit 104 to the reception device via the antenna 108. More specifically, the communication unit 106 modulates the data with a modulation scheme used for transmission, and performs digital-to-analog (DA) conversion on the modulated data. The frequency of the converted analog signal is up-converted, and band filtering is performed according to the frequency of the radio resource used for transmission. The band-filtered signal is amplified, and a radio signal is transmitted from the antenna 108.

Here, the first transmission processing unit 102 may decide whether or not to perform the first FEC on the basis of the service quality request provided from the higher layer processing unit 101. In a case of deciding not to perform the first FEC, the first transmission processing unit 102 generates data (data for code block generation, MAC frame, or the like) to be provided to the second transmission processing unit 104 without performing encoding of the first FEC by the first FEC encoding unit 103. The first transmission processing unit 102 provides the generated data to the second transmission processing unit 104.

Furthermore, the first transmission processing unit 102 or the second transmission processing unit 104 may notify the reception device of information regarding the first FEC. The information regarding the first FEC includes, as an example, at least one of the information indicating that the encoding of the first FEC is performed, the type of the erasure correction code, the number of symbols and the symbol length to which the first FEC is applied, the index of the symbol to which the first FEC is applied, or the type and the length of the error detection information.

Furthermore, the first transmission processing unit 102 may include a delimiter (symbol delimiter) including information indicating a boundary of encoded symbols at the end or head of the coded data. In addition to the information indicating the boundary, the symbol delimiter may include information indicating the order number of an adjacent encoded symbol (the immediately preceding encoded symbol or the subsequent encoded symbol), information of the address of the transmission destination (destination) of the data frame, or the like.

Furthermore, the first transmission processing unit 102 may add a header including information regarding the first FEC to the coded data. The header may include the above-described symbol delimiter. In addition, the second transmission processing unit 104 may add a header including information regarding the first FEC to the data of the physical layer.

Furthermore, the transmission device 100 may transmit the information regarding the first FEC at the time of a connection sequence performed at the time of initial connection with the reception device. Furthermore, the transmission device 100 may include information regarding the first FEC in the control information or the management information to be transmitted to the reception device. The control information may be information providing notification of a radio resource (a frequency resource, a time resource, a spatial resource, or a combination thereof) used for communication with the reception device. Furthermore, in a case where it is decided that the first FEC is performed from a state where the first FEC is not performed, the transmission device 100 may transmit information regarding the first FEC to the reception device. The transmission device 100 includes a notification unit that notifies the reception device of information regarding the first FEC. The notification unit may be included in the higher layer processing unit 101, the first transmission processing unit 102, the second transmission processing unit 104, or the communication unit 106.

Figure 5:
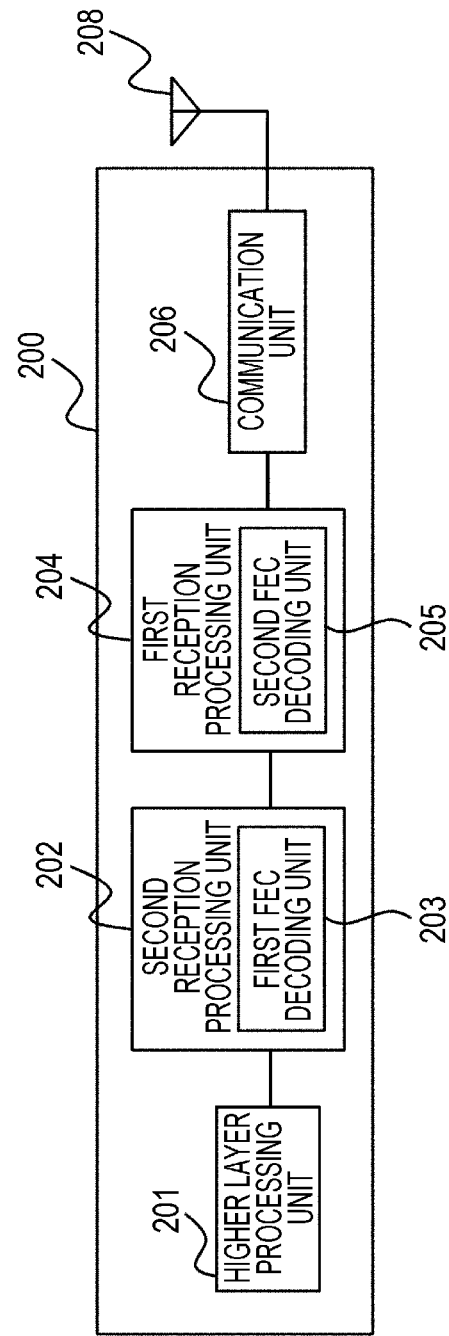
FIG. 5 is a block diagram schematically illustrating an example of a reception device which is an information processing device according to the present embodiment.

FIG. 5 is a block diagram schematically illustrating an example of a reception device 200 which is an information processing device according to the present embodiment. The reception device 200 includes a higher layer processing unit 201, a second reception processing unit 202 (processing unit), a first reception processing unit 204 (first protocol layer processing unit), a communication unit 206, and an antenna 208. In the present embodiment, the reception device 200 performs wireless communication, but a configuration for performing wired communication is also not excluded. In this case, the antenna 208 may not be provided.

The communication unit 206 receives a radio signal from the transmission device 100 via the antenna 208. The communication unit 206 performs low noise amplification on the received radio signal, performs frequency down-conversion, band filtering, and the like, and performs analog to digital (AD) conversion on the analog signal subjected to the band filtering. The digital signal obtained by the AD conversion is demodulated by a demodulation scheme corresponding to the modulation scheme used on the transmission side, and the demodulated data is provided to the first reception processing unit 204 as a data frame of the physical layer.

The first reception processing unit 204 performs processing related to the physical layer (first protocol layer). The first reception processing unit 204 acquires data of the physical layer from the communication unit 206. More specifically, the first reception processing unit 204 acquires a data frame which is data encoded by the erasure correction code which is the first code and further encoded by the second code from the communication unit 206. The first reception processing unit 204 includes a second FEC decoding unit 205.

The second FEC decoding unit 205 decodes the acquired data frame by a decoding scheme corresponding to the second code, and acquires decoded data of the second code (decoded data of the second FEC). The first reception processing unit 204 provides the decoded data to the second reception processing unit 202. In a case where the error detection information (CRC or the like) is added to the acquired data, the first reception processing unit 204 may perform CRC determination and provide a result of the CRC determination to the second reception processing unit 202.

As an example, in the case of the 3GPP standard, the first reception processing unit 204 performs CRC determination on the transport block included in the data frame. The second FEC decoding unit 205 divides a concatenation of code blocks included in the transport block into a plurality of code blocks, and performs decoding of the second FEC for each code block. The first reception processing unit 204 provides the decoded data (for example, the first encoded symbol) of each code block to the second reception processing unit 202 together with the determination result of the CRC of the transport block. The operation in the case of the 3GPP standard described here is an example.

As another example, in the case of the IEEE 802.11 standard, the first reception processing unit 204 processes the header of the data frame of the physical layer. The first reception processing unit 204 performs decoding of the second FEC on the data after the header processing to acquire the MAC frame. Note that a service field may be added to the MAC frame. The first reception processing unit 204 provides the acquired MAC frame to the second reception processing unit 202. The operation in the case of the IEEE 802.11 standard described here is an example.

The second reception processing unit 202 acquires data from the first reception processing unit 204. The second reception processing unit 202 includes a first FEC decoding unit 203. The first FEC decoding unit 203 decodes the acquired data by a decoding scheme corresponding to the first code (erasure correction code). The first FEC decoding unit 203 determines the error detection information added to the acquired data as an example, and specifies data whose determination result is OK. Data whose determination result is NG is regarded as lost data, and decoding is performed on the basis of data whose determination result is OK. In a case where the decoding is successful, the second reception processing unit 202 provides the data to the higher layer processing unit 201. In a case where the decoding fails (in a case where there is an error in the decoded data), retransmission request processing is performed. For example, a retransmission request (automatic repeat request (ARQ), hybrid ARQ (HARQ), or the like) is transmitted to the transmission device 100. The second reception processing unit 202 corresponds to a processing unit that transmits information requesting retransmission in a coding unit of the first code processed in the second protocol layer (for example, the data link layer) higher than the first protocol layer (for example, the physical layer) that performs processing related to the second code. Details of the retransmission request processing will be described later.

As an example, in the case of the 3GPP standard, in a case where the information of OK is acquired from the first reception processing unit 204 as a result of the CRC determination of the transport block, the second reception processing unit 202 judges that all the code blocks included in the transport block have been correctly received. The first FEC decoding unit 203 decodes the data provided from the first reception processing unit 204, and provides the decoded data (correctly decoded) to the higher layer processing unit 201. In a case where the result of the CRC determination of the transport block is NG, the CRC determination of the data (for example, the first encoded symbol) provided from the first reception processing unit 204 is performed. The first FEC decoding unit 203 regards an encoded symbol whose CRC determination result is NG as a lost symbol, and performs decoding using an encoded symbol whose CRC determination result is OK. In a case where the decoding of the first FEC is successful, the second reception processing unit 202 provides the decoded data of the first FEC to the higher layer processing unit 201. Furthermore, the second reception processing unit 202 transmits an acknowledgement response (ACK) to the transmission device 100. In a case where the decoding of the first FEC fails (in a case where there is an error in the decoded data or in a case where all the errors cannot be corrected), the second reception processing unit 202 performs retransmission request processing. For example, a retransmission request (such as ARQ, HARQ, or the like) is transmitted to the transmission device 100 by using a negative acknowledgement response (NACK). Details of the retransmission request processing will be described later. The operation described here is an example of an operation in the case of the 3GPP standard.

As another example, in the case of the IEEE 802.11 standard, the second reception processing unit 202 acquires the MAC frame from the first reception processing unit 204, processes the service field, and then determines the FCS for each MPDU. The second reception processing unit 202 determines error detection information (FCS or the like) of the first encoded symbol included in the MPDU with respect to the MPDU whose result of the FCS determination is NG. An encoded symbol whose determination result is NG is regarded as a lost symbol. The encoded symbol included in the MPDU whose result of the FCS determination is OK may be regarded as correctly received without performing the FCS determination. The first FEC decoding unit 203 performs decoding by using an encoded symbol whose result of the FCS determination is OK and an encoded symbol which is regarded to be correctly received. In a case where the decoding of the first FEC is successful, the second reception processing unit 202 provides the decoded data of the first FEC to the higher layer processing unit 201. Furthermore, the second reception processing unit 202 transmits an acknowledgement response (ACK) to the transmission device 100. In a case where the decoding of the first FEC fails (in a case where there is an error in the decoded data or in a case where all the errors cannot be corrected), the second reception processing unit 202 performs retransmission request processing. For example, a retransmission request (such as ARQ, HARQ, or the like) is transmitted to the transmission device 100 by using a negative acknowledgement response (NACK). Details of the retransmission request processing will be described later. The operation described here is an example of an operation in the case of the IEEE 802.11 standard.

The higher layer processing unit 201 performs processing of the higher layer. For example, the higher layer processing unit 201 passes the data provided from the second reception processing unit 202 to the application.

The communication quality between the reception device 200 and the transmission device 100 may be measured by the reception device 200. In this case, the reception device 200 may transmit information of the measured communication quality to the transmission device 100.

Figure 6:
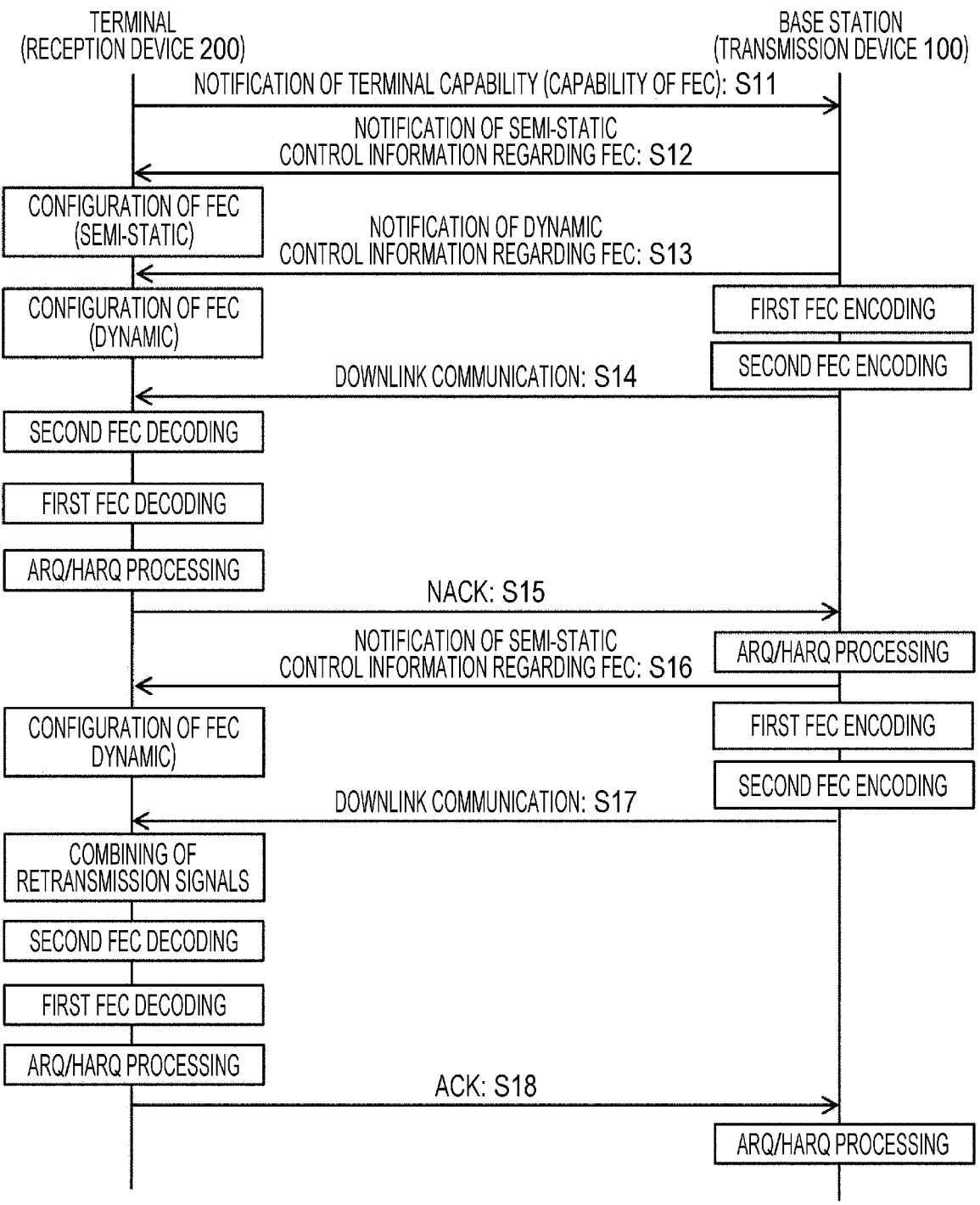
FIG. 6 is a diagram illustrating an example of a basic procedure of a communication sequence according to the present embodiment.

FIG. 6 illustrates an example of a basic procedure of a communication sequence according to the present embodiment. The figure illustrates an example of downlink communication from a base station to a terminal. Here, the base station is the transmission device 100 and the terminal is the reception device 200, but it is not limited to this case. The terminal may be a transmission device, and the base station may be a reception device. Here, the case of the 3GPP standard will be assumed, but a similar procedure can be performed in the case of the IEEE 802.11 standard.

First, the terminal notifies the base station of the cell to which the terminal itself is connected of information (terminal capability information) regarding the capability of the terminal (S11). As an example, the terminal capability information includes information regarding the capability of the first FEC and the capability of the second FEC. Notification of the terminal capability information is provided during an initial connection (initial access) procedure or provided after the initial connection. As the physical channel for notification, at least one of a random access channel (physical random access channel (PRACH)), an uplink control channel (physical uplink control channel (PUCCH)), or an uplink shared channel (physical uplink shared channel (PUSCH)) can be used.

The base station notifies the terminal connected to the cell managed by the base station of semi-static control information including information regarding the first FEC and the second FEC (S12). The semi-static control information may be cell-specific control information. Notification of this control information is provided during the procedure of the initial connection or after the initial connection. Furthermore, the notification of the semi-static control information may be provided as part of an RRC procedure such as radio resource control (RRC) signaling, RRC configuration, RRC reconfiguration, or the like. Furthermore, the notification of the semi-static control information may be periodically provided from the base station to the terminal. At least one of a broadcast channel (physical broadcast channel (PBCH)), a downlink control channel (physical downlink control channel, enhanced physical downlink control channel (EPDCCH)), or a downlink shared channel (physical downlink shared channel) can be used as the physical channel for providing notification of the control information.

Thereafter, in a case where downlink communication specifically occurs from the base station to the terminal, the base station notifies the terminal of control information (dynamic control information) such as a radio resource used for the downlink communication or the like from the base station (S13). Examples of occurrence of downlink communication from the base station to the terminal include a case where the terminal requests data download (pull), a case where push data occurs to the terminal, or the like.

The dynamic control information may include terminal-specific (UE-specific) or terminal-group-specific (UE-group-specific) control information. Here, the terminal group is, for example, a group of one or more terminals that are transmission destination targets in a case where the downlink communication is multicast or broadcast.

Examples of the dynamic control information include a frequency resource, a time resource, and a spatial resource for allocating downlink communication to a target terminal (or a terminal group). The frequency resource is, for example, a resource block, a subcarrier, a subcarrier group, or the like. The time resource is, for example, a subframe, a slot, a mini-slot, a symbol, or the like. The spatial resource is, for example, an antenna, an antenna port, a spatial layer, a spatial stream, or the like.

Furthermore, as another example of the dynamic control information, there is information regarding a non-orthogonal resource (power-related resources, interleave patterns, scramble patterns, diffusion patterns, or the like) of non-orthogonal multiple access (NOMA, multiuser superposition transmission (MUST), interleave division multiple access (IDMA), code division multiple access (CDMA)).

Furthermore, other examples of the dynamic control information include information regarding a modulation order, information regarding a modulation scheme, information regarding an encoding method and a coding rate of the second FEC, information regarding an encoding method and a coding rate of the first FEC, a setting related to ARQ/HARQ (new data indicator (NDI), redundancy version (RV), and the like), and the like. The modulation order represents the bit depth that can be transmitted with modulation symbols using a modulation scheme. The combination of the coding rate and the modulation scheme of the second FEC corresponds to, for example, a modulation and coding set (MCS).

The terminal that has received the dynamic control information performs setting for preparation for appropriate reception of downlink communication according to the received control information.

The base station transmits data of downlink communication to the terminal to the terminal on the basis of the control information notification of which is provided to the terminal (S14). More specifically, the base station encodes the data of the downlink communication by the first FEC, encodes the data encoded by the first FEC by the second FEC, and modulates the data encoded by the second FEC. The modulated data is converted into an analog signal, amplified, and then transmitted as a radio signal via an antenna. As a result, the radio signal is transmitted to the terminal.

The terminal receives a radio signal from the base station, performs AD conversion and demodulation on the received radio signal, further decodes the received radio signal by the second FEC, and further decodes the received radio signal by the first FEC. The demodulation, the second FEC decoding, and the first FEC decoding are performed according to the setting specified by the control information from the base station. The terminal transmits an ACK or a NACK (hereinafter, ACK/NACK) from the terminal to the base station depending on whether decoding of the data (original data) is successful or failed. In a case where the decoding fails, NACK is transmitted (S15), and in a case where the decoding succeeds, ACK is transmitted (S18).

The setting of the ARQ or HARQ processing may be changed depending on whether the data decoding is successful or failed. For example, in a case where the decoding fails, the terminal retransmits the signal for HARQ. In the base station, in order to combine retransmission signals, it is desirable to store a decoding result of data that has failed to be decoded or data that is being decoded (likelihood information such as a soft decision value, a log likelihood ratio (LLR), and the like) in a memory. The retransmission in ARQ or HARQ may be retransmission of an encoded symbol of the first FEC in which an error is detected, or may be retransmission of an encoded symbol necessary for decoding a data portion of data for which decoding has failed. Alternatively, retransmission of a code block in which an error is detected and retransmission of all blocks of the second FEC are also not excluded. The retransmission may be performed by another method.

The base station performs, according to the ACK/NACK received from the terminal, processing to be performed next. For example, in a case where notification of NACK is received (S15), preparation for retransmission of ARQ or HARQ is performed. Examples of preparation for the retransmission include selection of a redundancy version (RV), selection of a modulation and coding set (MCS), selection of a radio resource, and the like. The base station notifies the target terminal (or terminal group) of the dynamic control information again (S16), and performs the downlink communication according to the setting of the control information (S17).

In a case where the base station receives the ACK from the terminal (S18), the base station judges that the data to be transmitted is correctly received, and the base station moves to a process of transmitting next new data. The base station notifies the target terminal (or terminal group) of the dynamic control information again, and performs downlink communication according to the setting of the control information.

In the present embodiment, occurrence of retransmission is reduced by performing FEC (first FEC) in the data link layer in addition to FEC (second FEC) in the physical layer described above. Furthermore, by selecting an appropriate retransmission mode such that retransmission is performed in units of first code symbols (coding units of the data link layer) or the like, even in a case where it is necessary to perform retransmission, occurrence of unnecessary retransmission is prevented, and a time required for retransmission is shortened. Therefore, low-latency communication is realized.

Hereinafter, first, as a specific example of two-stage FEC, an example of processing of generating a data frame of the 3GPP standard using two-stage FEC encoding and processing of decoding the data frame will be described.

Figure 7:
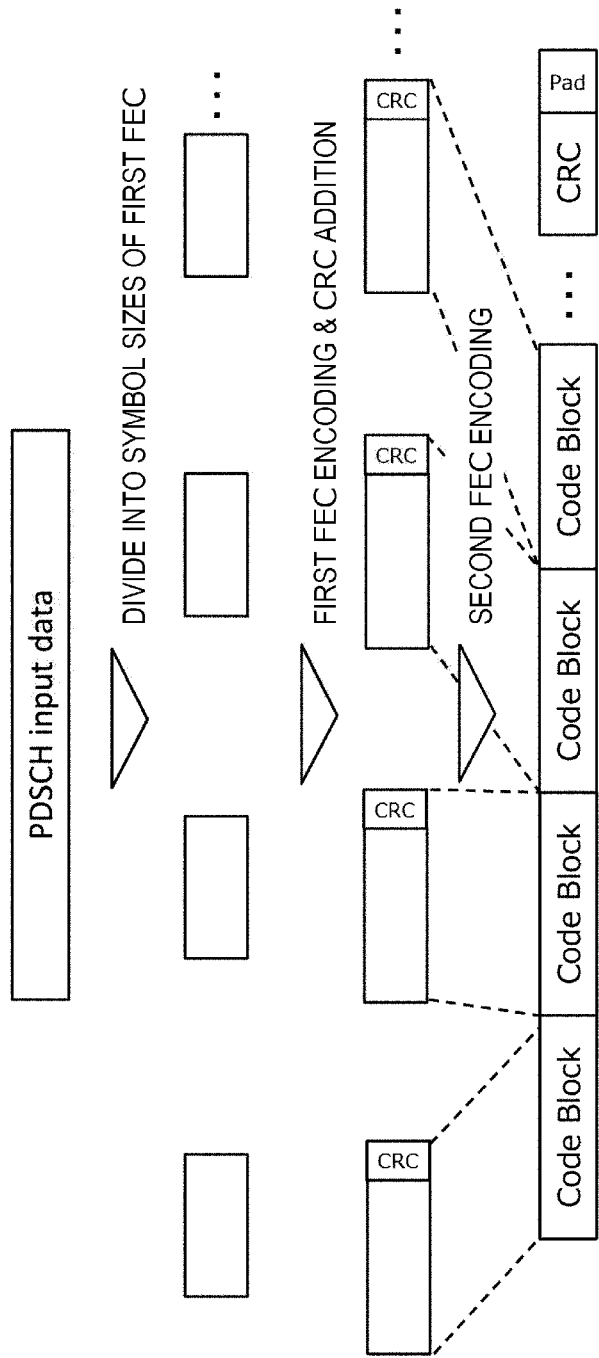
FIG. 7 is a diagram illustrating an example of a procedure of generating a data frame of the 3GPP standard using two-stage FEC encoding.

FIG. 7 illustrates an example of a procedure of generating a data frame of the 3GPP standard by using two-stage FEC encoding.

Figure 8:
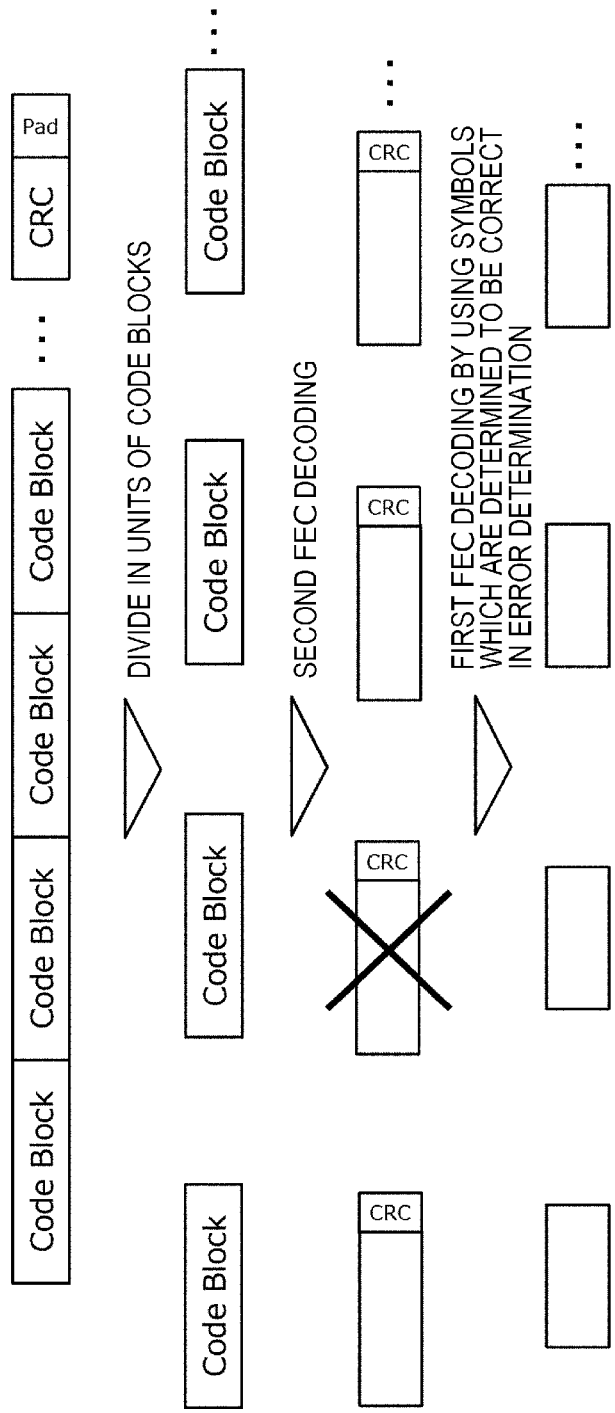
FIG. 8 is a diagram illustrating an example of a procedure of decoding a data frame generated by the procedure of FIG. 7.

FIG. 8 illustrates an example of a procedure of decoding the data frame generated by the procedure of FIG. 7.

In FIG. 7, the transmission device 100 divides input data (physical downlink shared channel (PDSCH) input data) to be transmitted into symbol sizes of the first FEC. The encoding (erasure correction coding) of the first FEC is performed on the symbols of the first FEC obtained by the division. CRCs are added to the symbols (encoded symbols) obtained by the encoding of the first FEC as the error detection information. A configuration in which the error detection information is not added is also possible.

The transmission device 100 generates code blocks by performing encoding of the second FEC (encoding in the physical layer) on the encoded symbols to which the CRCs are added.

The transmission device 100 generates a transport block by concatenating a plurality of code blocks. A CRC (CRC in units of transport blocks) is added to the transport block as error detection information.

The transmission device 100 adds padding data to the end of the transport block to which the CRC is added so as to match the symbol unit of modulation as necessary. Therefore, a data frame that is a transmission frame is generated. The transmission device 100 transmits the data frame to the reception device 200.

In FIG. 8, the reception device 200 that has received the data frame first performs CRC determination on the transport block. In a case where the result of the CRC determination is successful (OK), all the code blocks included in the transport block can be correctly received. Hence, the reception device 200 performs decoding of the FEC (decoding of the second FEC and decoding of the first FEC), and transmits an acknowledgement response (ACK) to the transmission device 100.

In a case where a result of the CRC determination of the transport block is failure (NG), the reception device 200 performs decoding of the second FEC on each code block included in the transport block, and obtains encoded symbols of the first FEC. Determination of the CRC added to each encoded symbol is performed. In the example of FIG. 8, the result of the CRC determination on the second encoded symbol from the left is NG.

The reception device 200 regards the encoded symbol whose result of the CRC determination is NG as a lost symbol. The reception device performs decoding of the first FEC using the encoded symbols whose results of the CRC determination are successful (OK). That is, in the decoding of the first FEC, the encoded symbol whose result of the CRC determination is NG is regarded as a lost symbol and is not used for decoding.

As another specific example of two-stage FEC, an example of processing of generating a data frame of the IEEE 802.11 standard using two-stage FEC encoding and processing of decoding the data frame will be described.

Figure 9:
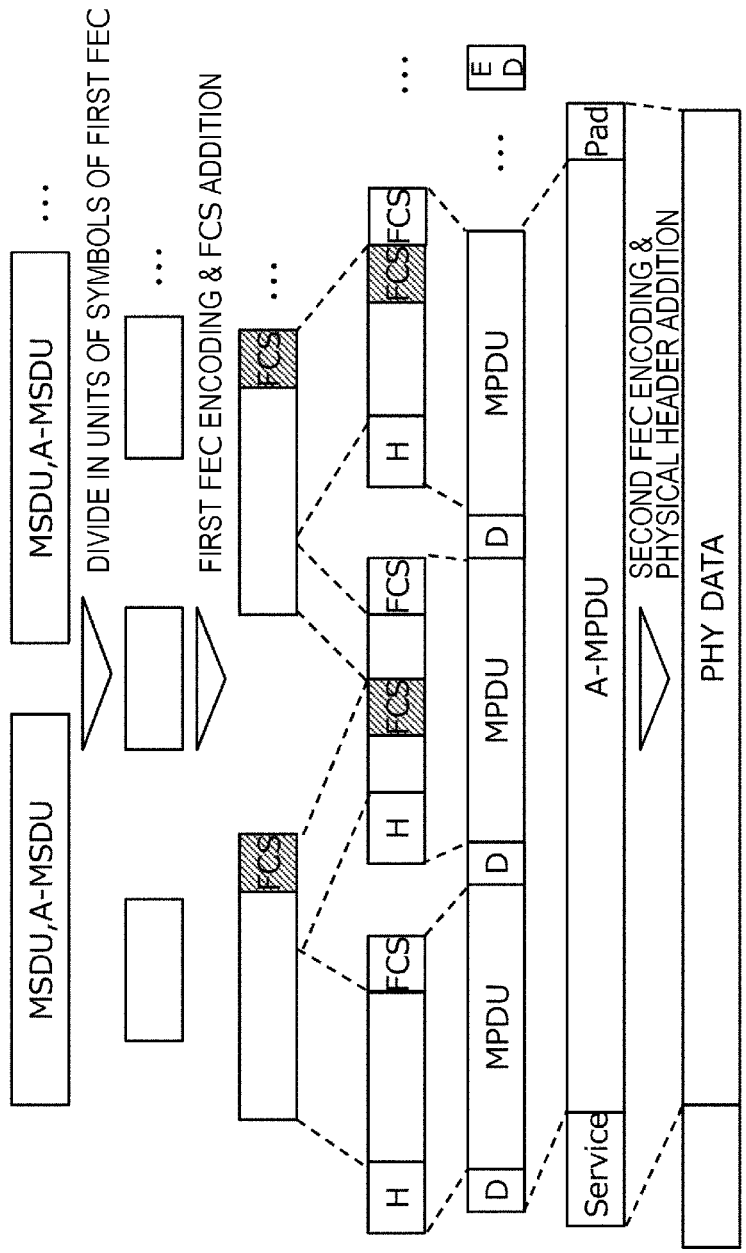
FIG. 9 is a diagram illustrating an example of a procedure of generating a data frame of the IEEE 802.11 standard using two-stage FEC encoding.

FIG. 9 illustrates an example of a procedure of generating a data frame of the IEEE 802.11 standard using two-stage FEC encoding.

Figure 10:
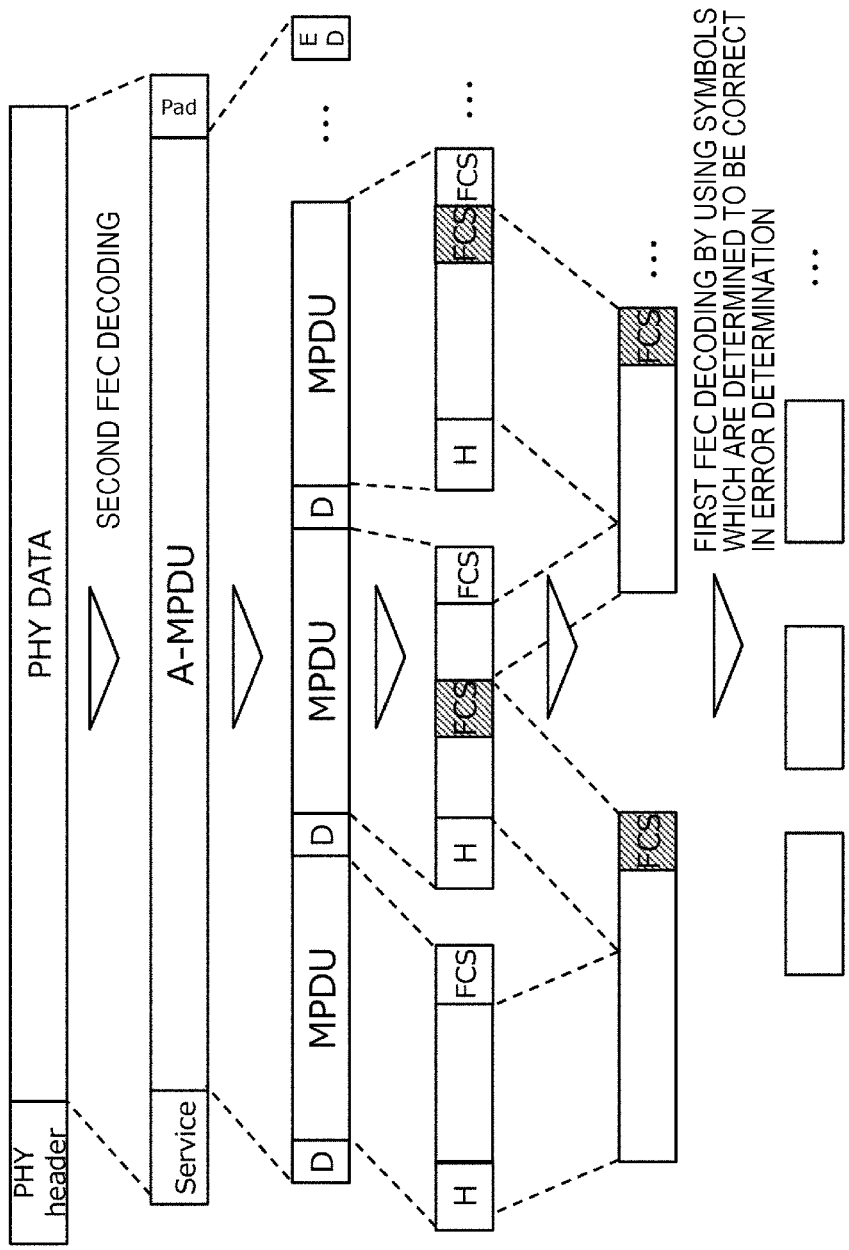
FIG. 10 is a diagram illustrating an example of a procedure of decoding a data frame generated by the procedure of FIG. 9.

FIG. 10 illustrates an example of a procedure of decoding the data frame generated by the procedure of FIG. 9.

In the transmission device 100, data to be transmitted is divided into MAC protocol data units (MPDU) which are retransmission units, and is set as an MSDU or an A-MSDU.

The transmission device 100 uses the MSDU or A-MSDU as input data and divides the input data into symbol units to which the first FEC is applied.

The transmission device 100 encodes the symbols obtained by the division according to the first FEC. Error detection information (FCS or the like) is added to the symbols encoded by the first FEC to generate first encoded symbols. A configuration in which the error detection information is not added is also possible.

The transmission device 100 generates the main body data of the MAC frame by dividing and concatenating the first encoded symbols on the basis of the length of an MPDU. An MPDU is generated by adding an MPDU header, an FCS, and the like to the main body data.

The transmission device 100 adds an MPDU delimiter including information regarding a boundary between MPDUs to a head portion of each MPDU. An aggregated MPDU (A-MPDU) is generated by concatenating MPDUs via MPDU delimiters and adding an MPDU delimiter (EOF MPDU delimiter) indicating the end to the end.

The transmission device 100 adds a service field and padding data to the A-MPDU. The encoding of the second FEC is performed on the A-MPDU to which the service field and the padding data are added.

A data frame is generated by adding a physical header to the A-MPDU after encoding of the second FEC. The data frame is transmitted by the transmission device 100.

An example of a procedure in which the reception device 200 receives the data frame transmitted from the transmission device 100 and performs decoding will be described with reference to FIG. 10.

First, the reception device 200 performs decoding of the second FEC on the basis of the information set in the physical header.

The reception device 200 processes the service field and the padding data included in the data obtained by the decoding of the second FEC to obtain the A-MPDU. The reception device 200 divides the acquired A-MPDU into units of MPDUs on the basis of the MPDU delimiters.

The reception device 200 determines the FCS of each MPDU. The main body data of the MPDUs (obtained by removing the MPDU headers and the FCSs from the MPDUs) is obtained, and the main body data is concatenated to obtain the first encoded symbols.

In a case where the determination results of the FCSs of the plurality of (two in this example) MPDUs as the concatenation sources are all OK, the determination of the FCSs of the concatenated first encoded symbols are also OK. Therefore, the determinations of the FCSs may be omitted. On the other hand, in a case where at least one of the determinations of the FCSs of the plurality of MPDUs as the concatenation sources is NG, determinations of the FCSs of the concatenated first encoded symbols are performed. An encoded symbol whose determination result is NG is regarded as a lost symbol. The reception device 200 attempts to perform decoding of the first FEC by using the encoded symbols whose determination results are OK. In a case where the decoding is successful, an acknowledgement response (ACK) is transmitted to the transmission device 100. In addition, data obtained by decoding is provided to the higher layer processing unit 201.

In a case where there is an error in the data obtained by the decoding of the first FEC, retransmission is requested to the transmission device 100 by using a negative acknowledgement response (NACK). Details of the retransmission request processing will be described later.

The example in which the data frame of the 3GPP standard or the IEEE 802.11 standard is generated in the transmission device 100 using the two-stage FEC encoding and the data frame is decoded in the reception device 200 has been described above.

Hereinafter, processing at the time of decoding in the reception device 200 will be described in more detail.

Figure 11:
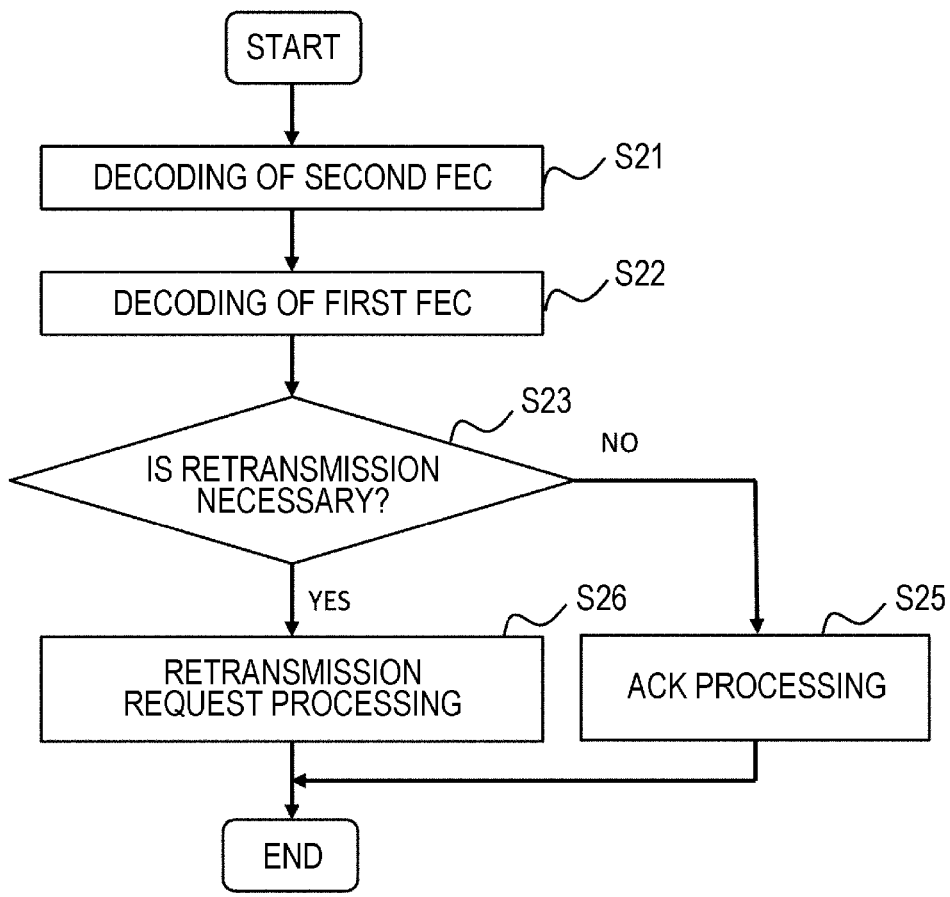
FIG. 11 is a flowchart of an example of reception processing in the reception device.

FIG. 11 is a flowchart of an example of reception processing in the reception device 200. As an example, the reception processing includes processing related to decoding of the second FEC, decoding of the first FEC, and ARQ/HARQ.

In a case where the reception device 200 receives data frame, the first reception processing unit 204 performs decoding of the second FEC on the data frame (S21). The second reception processing unit 202 acquires the first encoded symbols from the decoded data of the second FEC, and performs decoding of the first FEC on the basis of the first encoded symbols (S22). The second reception processing unit 202 judges whether it is necessary to request retransmission to the transmission device 100 (S23). That is, it is judged whether or not the first encoded symbols are insufficient for decoding of the first FEC.

In a case where it is not necessary to request retransmission (NO in S23), the second reception processing unit 202 transmits ACK as an acknowledgement response. In a case where it is necessary to request retransmission (YES in S23), retransmission request processing according to the present embodiment is performed (S24). Details of the retransmission request processing will be described later.

Various determination criteria can be used to determine whether retransmission needs to be requested. As an example, when the encoded symbols of the first FEC (encoded symbols of the first code) necessary for decoding of the first FEC cannot be correctly received by the required number (threshold) or more (when decoding of the second code fails), it is judged that it is necessary to request retransmission. Conversely, when the encoded symbols of the first FEC has been correctly received by the threshold or more (when the decoding of the second code has succeeded), it is judged that there is no need to request retransmission. Alternatively, as a result of the decoding of the first code, it is judged whether all of the data to be received by the higher layer processing unit 201 of the reception device 200 (the data generated for transmission by the higher layer processing unit 101 of the transmission device 100) has been correctly received. In a case where at least a part of the data is not correctly received, it is judged that it is necessary to request retransmission.

For example, in the case of the 3GPP, in a case where the CRCs are added to the encoded symbols of the first FEC (for example, when the CRCs are included in the code blocks), whether it is necessary to request retransmission may be judged on the basis of the results of the CRC determination of the encoded symbols of the first FEC. In a case where all the results of the CRC determination of the encoded symbols of the first FEC indicate success, it is judged that the request for retransmission is not necessary. On the basis of the results of the CRC determination of the encoded symbols of the first FEC, the number of encoded symbols of the first FEC that has been successfully received (correctly received) is counted. It is judged whether the counted value is a threshold or more. In a case where it is equal to or greater than the threshold, it is judged that there is no need to request retransmission. In a case where it is less than the threshold, it is judged that it is necessary to request retransmission.

As another method, on the basis of the CRC determination of the transport block performed before the decoding of the second FEC, in a case where the determination result indicates success, it may be judged that the retransmission request is not necessary.

Also in the case of the IEEE 802.11 standard, it is possible to determine whether or not it is necessary to request retransmission in a similar manner to the 3GPP standard.

Figure 12:
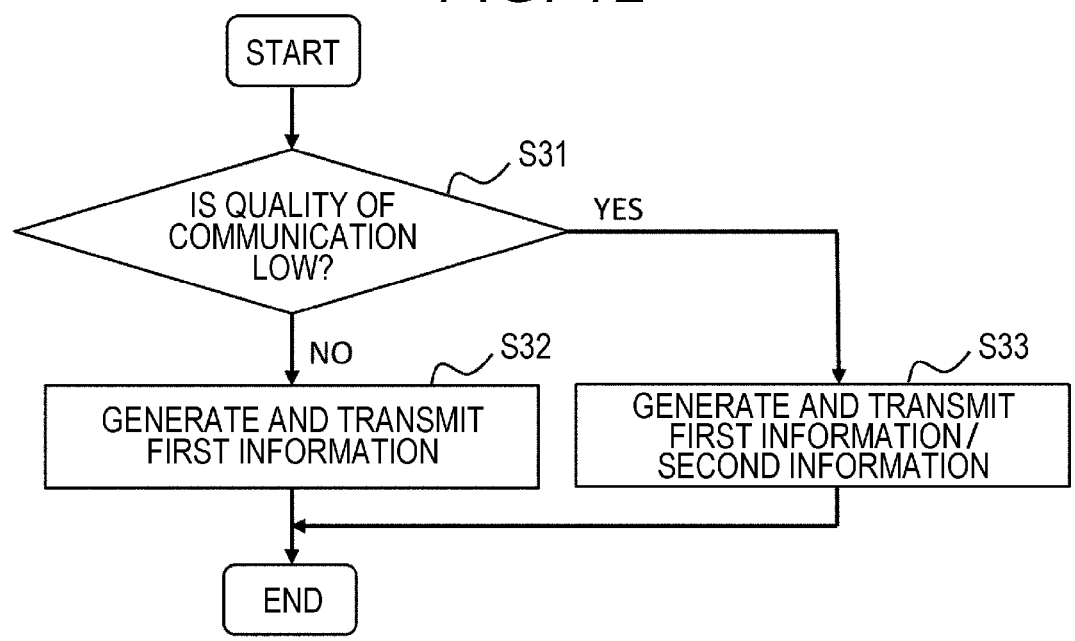
FIG. 12 is a flowchart of an example of retransmission request processing performed in step S24.

FIG. 12 is a flowchart illustrating an example of retransmission request processing performed in step S24. The first reception processing unit 204 of the reception device 200 judges whether or not the quality of communication with the transmission device 100 (the state of the propagation path) is low (S31). For example, it is assumed that at least a total of X correctly received encoded symbols of the first FEC are required to correctly decode all data by decoding of the first FEC. In this case, in a case where the number of encoded symbols of the first FEC equal to or greater than the threshold (value less than X) or the number of encoded symbols of the first FEC equal to or greater than the threshold ratio has been correctly received, it is judged that the quality of communication is not low. On the other hand, in a case where the number of correctly received encoded symbols of the first FEC is less than the threshold or less than the threshold ratio, it is judged that the quality of communication is low.

In a case of judging that the quality of communication is not low (NO in S31), for example, in a case of judging that the number of encoded symbols of the first FEC for which reception has failed is small, the first reception processing unit 204 decides to request only retransmission of the encoded symbols of the first FEC. The encoded symbols for which retransmission is requested are, for example, encoded symbols of the first FEC that are insufficient for decoding of the first FEC (that is, need to be additionally received). The first reception processing unit 204 generates first information necessary for requesting retransmission of the encoded symbols of the first FEC (S32). The first information includes information for specifying the encoded symbols of the first FEC for which retransmission is requested.

Specifically, the first information includes at least one of the following (1A) to (1D). However, the following is an example, and other information can be used as the first information.

(1A) Index information of the encoded symbols for which retransmission is requested. For example, in a case where at least two encoded symbols are additionally required for decoding of the first FEC, index information of the two encoded symbols or 2+α encoded symbols including the margin a. Note that it includes a case where the index information is position information indicating the numbers from the head in addition to the identifiers allocated to the encoded symbols.

(1B) The number of encoded symbols for which retransmission is requested. Depending on the encoding scheme, encoded symbols different from those at the time of the first transmission can be newly generated on the transmission side. In this case, the number of encoded symbols of the first FEC necessary for decoding of the first FEC is newly received by specifying the number.

(1C) Index information of first encoded symbols that have not been correctly decoded (that is, have not been correctly received) by decoding of the FEC. As an example, there is index information of the first encoded symbols in which the results of the CRC determination added to the encoded symbols of the first FEC were failure (error).

(1D) The number of first encoded symbols that have not been correctly decoded (that is, have not been correctly received) by decoding of the second FEC.

The first reception processing unit 204 transmits retransmission request information including the generated first information to the transmission device 100 (same as above, S32). The retransmission request information may be transmitted together with an acknowledgement response (ACK or NACK). For example, it is assumed that some of the plurality of MPDUs included in the A-MPDU have been successfully received, and the remaining MPDUs have failed to be received. In this case, a frame including the ACK of the MPDUs that have been successfully received, the NACK of the MPDUs that have failed to be received, and the retransmission request information is transmitted to the transmission device 100. Alternatively, when the transmission of the first information implicitly includes NACK and the first transmission processing unit 102 of the transmission device 100 can interpret that the transmission of the first information includes NACK, the transmission of NACK may be omitted.

On the other hand, in a case of judging that the quality of communication is low (YES in S31), for example, in a case of judging that the number of encoded symbols of the first FEC for which reception has failed is large, the first reception processing unit 204 generates second information together with the above-described first information or instead of the first information. Whether to generate the first information or not may be switched according to the type of the second information. In a case where it is judged that the quality of communication is low, it is judged that there is a high possibility that the decoding of the first FEC will not succeed in the next reception only by requesting retransmission of the encoded symbols of the first FEC, and the second information is generated and transmitted.

Specifically, the second information includes at least one of the following (2A) to (2G). However, the following is an example, and other information can be used as the second information.

(2A) A request for retransmission of all or a part of data (original data) to be encoded by the first FEC. In this case, in the data retransmission, the encoding of the first FEC (the encoding of the first code) and the encoding of the second FEC are all redone. The part of the data corresponds to, for example, the remaining portion in a case where a part of the data has been successfully decoded in the decoding of the first FEC but the remaining portion has not been successfully decoded. Note that it may be requested to perform encoding of the second FEC without performing encoding of the first FEC on all or a part of the data.

(2B) A type of the code (first code) used for encoding of the first FEC for data or a part requested to be retransmitted in (2A).

(2C) Information designating the modulation multi-level number of data requested to be retransmitted in (2A). Alternatively, information designating the modulation multi-level number of the encoded symbols of the first FEC designated by the first information. In a case where many errors occur in the encoded symbols of the first FEC, the modulation multi-level number is reset to a low value, for example.

(2D) Information designating a symbol size and the number of symbols to be encoded by the first FEC for data requested to be retransmitted in (2A).

(2E) Information designating a coding rate at which encoding of the first FEC is performed on data requested to be retransmitted in (2A). In a case where many errors occur in the encoded symbols of the first FEC, the coding rate of the first FEC is reset to a high value, for example.

(2F) Information designating a coding rate at which encoding of the second FEC is performed on data requested to be retransmitted in (2A). In a case where many errors occur in the encoded symbols of the first FEC, the coding rate of the second FEC is reset to a high value, for example.

The first reception processing unit 204 transmits retransmission request information including the second information and the first information (only the second information in a case where the first information is not transmitted) to the transmission device 100 (S33). The retransmission request information may be transmitted together with an acknowledgement response (ACK or NACK). For example, it is assumed that some of the plurality of MPDUs included in the A-MPDU have been successfully received, and the remaining MPDUs have failed to be received. In this case, a frame including the ACK of the MPDUs that have been successfully received, the NACK of the MPDUs that have failed to be received, and the retransmission request information is transmitted to the transmission device 100. Alternatively, when transmission of the second information and the first information implicitly includes NACK and the first transmission processing unit 102 of the transmission device 100 can interpret that the transmission includes NACK, transmission of NACK may be omitted.

The transmission device 100 generates a data frame for retransmission by using the first information, the second information, or both the first information and the second information received from the reception device 200. The transmission device 100 transmits a signal (retransmission signal) including a data frame for retransmission.

Figure 13:
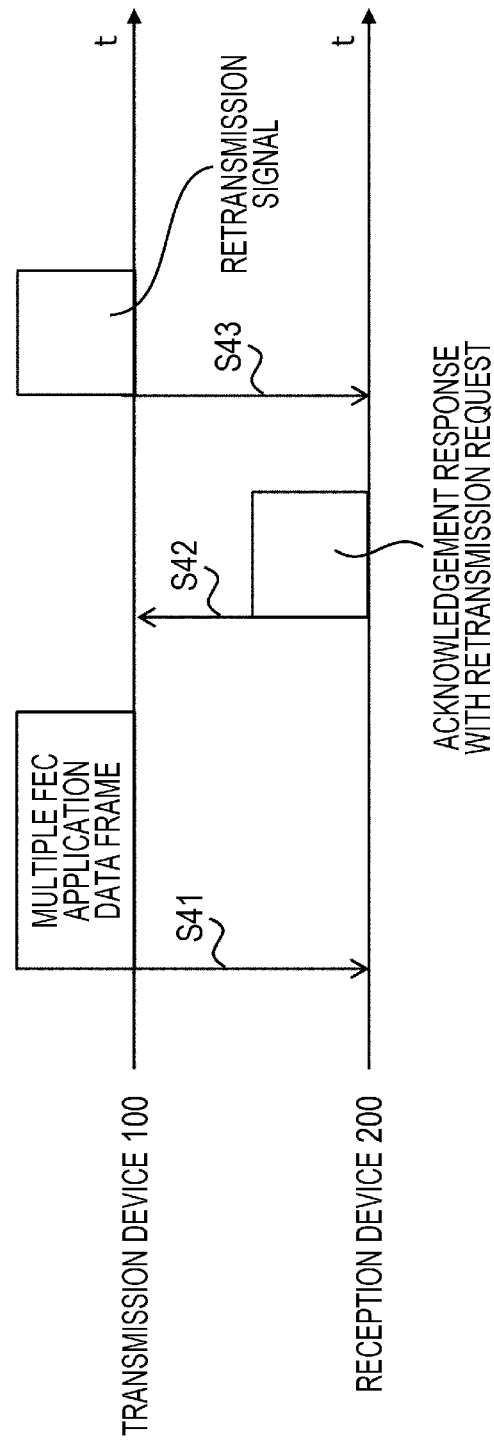
FIG. 13 is a sequence example of operations between the transmission device and the reception device.

FIG. 13 is a sequence example of operations between the transmission device 100 and the reception device 200. The transmission device 100 transmits the data frame generated by performing the encoding of the first FEC and the encoding of the second FEC in stages (S41). In a case where the reception device 200 performs the operation illustrated in FIG. 11 and judges that it is necessary to request retransmission, the reception device 200 generates retransmission request information including at least one of the first information or the second information by performing the operation illustrated in FIG. 12. The reception device 200 transmits a response frame (acknowledgement response frame with retransmission request) including the retransmission request information and at least one of NACK or ACK as the first frame according to the present embodiment (S42). The transmission device 100 generates a data frame for retransmission on the basis of the retransmission request information included in the response frame received from the reception device 200 and at least one of NACK or ACK. The reception device 200 transmits the signal (retransmission signal) including the retransmission data frame to the transmission device 100 (S43).

Figure 14:
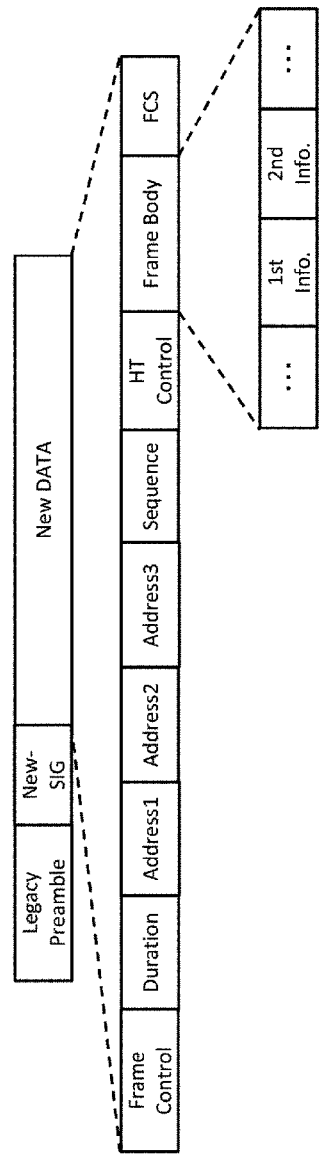
FIG. 14 is a diagram illustrating a format example of a MAC frame including retransmission request information and an acknowledgement response.

FIG. 14 illustrates a format example of an acknowledgement response frame with retransmission request. Some of the illustrated fields may not be present, or fields not illustrated may be added. The format example of FIG. 14 is an example, and other formats may be used.

At least one of the first information or the second information is stored in the frame body field. At least one of ACK or NAC is also stored in the frame body field. Arrangement information indicating at which position in the frame body field the first information, the second information, the ACK, and the NACK are stored may be stored in the head region of the frame body field. Alternatively, for example, an additional new control field may be added after the HT control field, and the arrangement information may be stored in the added field. The head sequence number of the MPDU group to be subjected to the ACK and the NACK may be stored in the sequence field. In this case, bitmap information indicating ACK or NACK for consecutive sequence numbers after the head sequence number may be stored in the position indicated by the arrangement information described above in the frame body field. The type of the acknowledgement response frame with retransmission request is, for example, a control frame, but may be a management frame or a data frame. A new value (a value for identifying an acknowledgement response with a retransmission request) may be defined as the subtype of the frame in the present embodiment, and the value may be stored in the subtype field of the frame control field.

In a case where the retransmission request information is transmitted together with at least one of the ACK or the NACK in the frame of the 3GPP standard, an acknowledgement response frame with retransmission request can be defined similarly.

Figure 15:
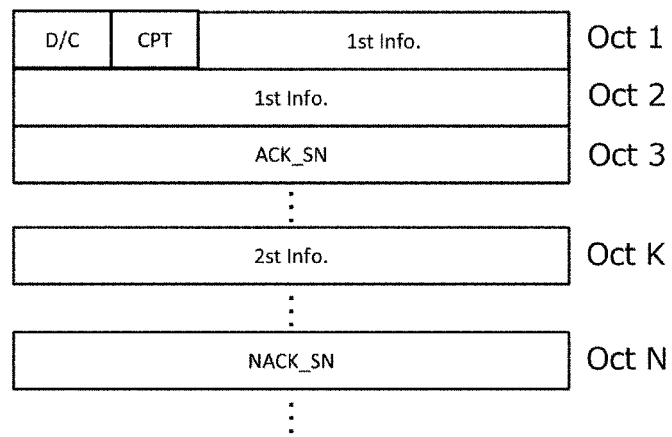
FIG. 15 is a diagram schematically illustrating a format example of an acknowledgement response frame with retransmission request in the case of the 3GPP standard.

FIG. 15 schematically illustrates a format example of an acknowledgement response frame with retransmission request in the case of the 3GPP standard.

The first information is stored in the "1st Info." field, the second information is stored in the "2nd Info." field, the sequence number of the ACK is stored in the "ACK_SN" field, and the sequence number of the NACK is stored in the "NACK_SN" field. The D/C field stores information for distinguishing between data RLC data protocol data unit (PDU) and Control RLC PDU. Control PDU type (CPT) stores information specifying the type of control PDU. The illustrated format example is an example, and other fields may be present.

As described above, according to the present embodiment, in the communication system in which the base station and the terminal communicate with each other, in addition to the encoding of the second FEC performed in the physical layer, the encoding of the first FEC is performed in the data link layer (for example, the MAC layer of Layer 2 IEEE 802.11 of the 3GPP standard) higher than the physical layer. In this case, a unit of retransmission is an encoded symbol unit (a coding unit of a data link layer) of the first FEC. That is, conventionally, retransmission is performed in units of code blocks in the 3GPP standard, and is performed in units of MAC protocol data unit MPDUs in IEEE 802.11. Meanwhile, in the present embodiment, the encoding of the first FEC in the data link layer is introduced, and the unit of retransmission is set as the encoded symbol of the first FEC. Therefore, the possibility of retransmission can be reduced, and the time required for retransmission can be shortened even in a case where retransmission occurs. Therefore, low-latency communication can be realized.

(First Modification)

The second reception processing unit 202 of the reception device 200 may set, in the acknowledgement response frame with retransmission request, information (reservation information) for securing a period during which radio resources are used for transmission of a retransmission signal as a reservation period (first period). By causing the transmission device 100 to transmit a retransmission signal during a reservation period, acquisition of an access right by carrier sense multiple access with carrier avoidance (CSMA/CA) can be omitted, and a latency related to retransmission can be suppressed.

Figure 16:
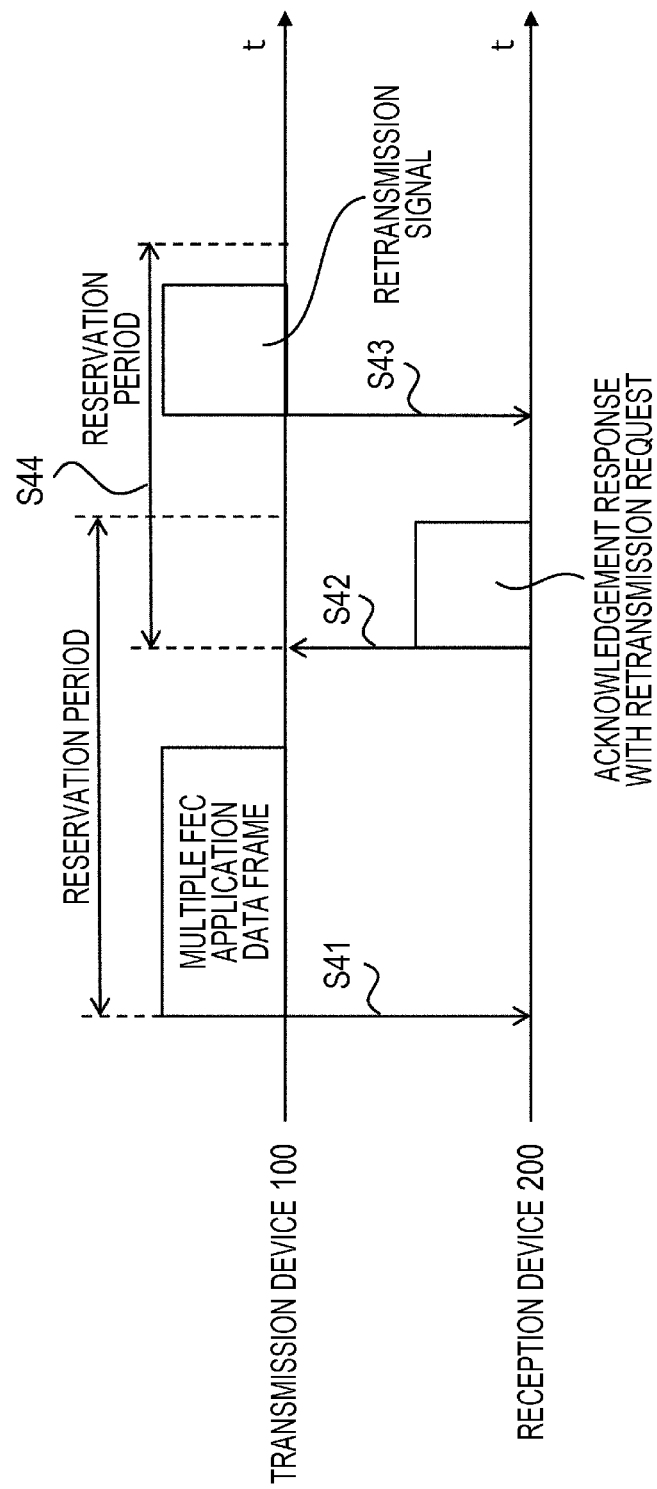
FIG. 16 is a diagram illustrating a sequence example of operations between the transmission device and the reception device according to a first modification.

FIG. 16 illustrates a sequence example of operations between the transmission device 100 and the reception device 200 according to a first modification. In the example of the sequence of FIG. 13 described above, an example of setting reservation information in an acknowledgement response frame with retransmission request is illustrated. In this example, the case of the IEEE 802.11 standard is assumed. Information (reservation information) for reserving a period until an acknowledgement response or an acknowledgement response with a retransmission request is received from the reception device 200 is set in the duration field of the data frame transmitted by the transmission device 100 in the sequence S41. Within the period indicated by this information, the communication unit 206 of the reception device 200 can transmit the acknowledgement response frame with retransmission request after a certain period of time from the reception of the data frame without obtaining the access right to the wireless medium by CSMA/CA. As the second frame according to the present modification, the reception device 200 sets information (reservation information) for securing a period for causing the transmission device 100 to transmit a retransmission signal using radio resources as a reservation period (first period) in the acknowledgement response frame with retransmission request (S44). The reservation information may be set in the duration field as an example, or may be set in other fields. The reservation information may be generated by extending the reservation period set in the data frame by the transmission device 100 to the transmission period of the retransmission signal. The transmission device 100 that has received the acknowledgement response frame with retransmission request transmits the retransmission signal within a period determined by the reservation information set in the frame. The transmission device 100 transmits the retransmission signal, for example, after a certain period of time from reception of the acknowledgement response frame with retransmission request. The transmission device 100 does not need to obtain the access right to the wireless medium by CSMA/CA. Other devices (devices other than the transmission destination device of the frame) that have received the acknowledgement response frame with retransmission request refrain from transmission for a period determined by the reservation information. Therefore, the possibility that the retransmission signal transmitted by the transmission device 100 collides with another signal is reduced. Therefore, a retransmission signal can be transmitted at a high speed, and a latency related to retransmission can be suppressed.

In the example of FIG. 16, it is assumed that the retransmission signal is transmitted using the same radio resource (for example, a frequency channel) as the data frame transmitted in the sequence S41 or the same radio resource (for example, a frequency channel) as the acknowledgement response frame with retransmission request. As another method, information (radio resource designation information) designating a radio resource for transmitting a retransmission signal may be set in the acknowledgement response frame with retransmission request as the third frame according to the present modification. For example, the radio resource designation information may be set in the SIG field, may be set in the HT control field or a newly defined control field, or may be set in other fields. The transmission device 100 transmits the retransmission signal using the radio resource designated in the acknowledgement response frame with retransmission request. The second reception processing unit 202 of the reception device 200 may designate, for example, a radio resource with high communication quality among a plurality of radio resources. As a result, a retransmission signal can be transmitted at a high speed, and a latency related to retransmission can be suppressed. Both the radio resource designation information and the reservation information described above may be set, or only one of them may be set.

(Second Modification)

The transmission device 100 may transmit the retransmission signal using a radio resource allocated to another user (terminal or base station) which is a device other than the reception device 200. As a result, even in a case where it takes time to secure radio resources for transmitting the retransmission signal, the retransmission signal can be transmitted at a high speed, and a latency related to the retransmission can be suppressed. Note that, in the second modification, it is not always necessary that the retransmission signal has the format of the data frame, and it is sufficient that the retransmission signal includes data designated by at least one of the first information or the second information (for example, the encoded symbols of the first FEC designated by the first information or the like).

FIG. 17 illustrates a sequence example of operations between the transmission device 100 and the reception device 200 according to a second modification. Similarly to the sequence of FIG. 13 described above, a data frame is transmitted from the transmission device 100 (S41), and an acknowledgement response frame with retransmission request is transmitted from the reception device 200 (S42). The first transmission processing unit 102 or the second transmission processing unit 104 of the transmission device 100 decides a resource portion used for transmission of a retransmission signal among radio resources allocated to other users other than the reception device 200. The first transmission processing unit 102 or the second transmission processing unit 104 transmits notification information indicating that the retransmission signal is transmitted using the decided resource portion to the reception device 200 (S45). The notification information may be information designating the position of the resource portion. Alternatively, a part of padding data of data transmitted to another user via a radio resource may be replaced with a retransmission signal. In this case, the notification information may include a position where the retransmission signal is included in the data addressed to another user (corresponding to the position of the resource portion) and information for specifying the data addressed to another user (sequence number, address of another user, or the like). The notification information is only required to be transmitted to the reception device 200 by an arbitrary method. For example, the notification information may be transmitted by using a control channel of the 3GPP standard. Alternatively, in a case where a mechanism for transmitting an acknowledgement response (ACK) for an acknowledgement response frame with retransmission request is introduced, notification information may be included in the acknowledgement response. The communication unit 106 of the transmission device 100 transmits the data frame including the retransmission signal via the above-described resource portion (S46). The reception device 200 acquires the retransmission signal via the resource portion in the received data frame (same as above, S46).

Figure 18A:
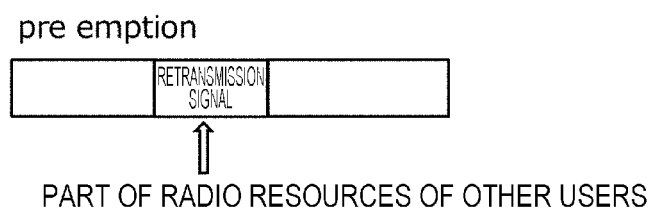
FIGS. 18A and 18B are diagrams illustrating a specific example in which a retransmission signal is transmitted from the transmission device.
Figure 18B:
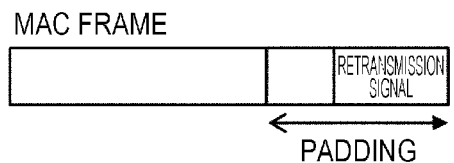

FIGS. 18A and 18B illustrate a specific example in which a retransmission signal is transmitted from the transmission device 100. In FIG. 18A, in the case of using pre-emption of the 3GPP standard, a retransmission signal for the reception device 200 is allocated to a part (resource block) of radio resources allocated to other users. In FIG. 18B, in the case of the IEEE 802.11 standard, a part of padding data of a MAC frame transmitted to another user is replaced with a retransmission signal for the reception device 200. The reception device 200 receives a MAC frame addressed to another user, and specifies a retransmission signal included in the padding data on the basis of notification information acquired in advance from the transmission device 100.

(Hardware Configuration)

Figure 19:
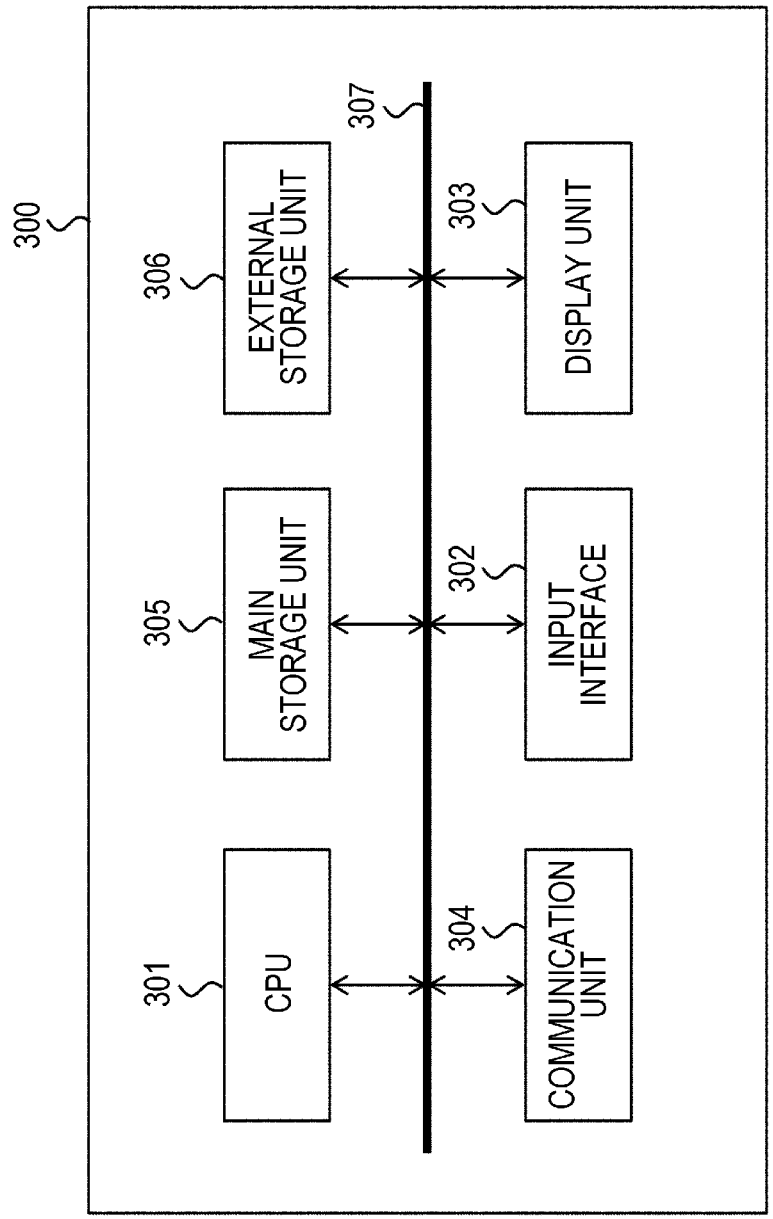
FIG. 19 is a diagram illustrating an example of a hardware configuration of the information processing device according to the present embodiment.

FIG. 19 illustrates an example of a hardware configuration of the information processing device according to the present embodiment. The information processing device includes a computer device 300. The information processing device corresponds to the transmission device 100 or the reception device 200. The computer device 300 includes a CPU 301, an input interface 302, a display unit 303, a communication unit 304, a main storage unit 305, and an external storage unit 306, which are connected to each other via a bus 307. A part of the configuration illustrated in FIG. 19 may not be present. For example, the display unit 303 or the input interface 302 may not be present. Furthermore, elements other than the configuration illustrated in FIG. 19 may be present. For example, there may be a battery that supplies power to each element, or a sensor device such as a camera, a microphone, or the like.

The central processing unit (CPU) 301 executes a computer program on the main storage unit 305. The computer program is a program that implements each of the above-described functional configurations of the information processing device. The computer program may be implemented not by one program but by a combination of a plurality of programs and scripts. The CPU 301 executes the computer program to implement each functional configuration.

The input interface 302 is a circuit for inputting an operation signal from an input device such as a keyboard, a mouse, a touch panel, and the like to the information processing device.

The display unit 303 displays data stored in the information processing device or data calculated by the information processing device. The display unit 303 is, for example, a liquid crystal display (LCD), an organic electroluminescence display, a cathode ray tube (CRT), or a plasma display (PDP), but is not limited thereto.

The communication unit 304 is a circuit for the information processing device to communicate with an external device in a wireless or wired manner. Data used in the information processing device can be input from an external device via the communication unit 304. The communication unit 304 includes an antenna. Data input from an external device can be stored in the main storage unit 305 or the external storage unit 306.

The main storage unit 305 stores a computer program, data necessary for execution of the computer program, data generated by execution of the computer program, and the like. The computer program is developed and executed on the main storage unit 305. The main storage unit 305 is, for example, RAM, DRAM, or SRAM, but is not limited thereto.

The external storage unit 306 stores a computer program, data necessary for execution of the computer program, data generated by execution of the computer program, and the like. These computer programs and data are read into the main storage unit 305 when the computer program is executed. The external storage unit 306 is, for example, a hard disk, an optical disk, a flash memory, or a magnetic tape, but is not limited thereto.

Note that the computer program may be installed in the computer device 300 in advance or may be stored in a storage medium such as a CD-ROM and the like. Furthermore, the computer program may be uploaded on the Internet.

Furthermore, the computer device 300 may be configured as a single device, or may be configured as a system including a plurality of computer devices connected to each other.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are included in the invention described in the claims and the equivalent scope thereof.

Furthermore, the effects of the present disclosure described in the present specification are merely examples, and other effects may be provided.

Note that the present disclosure can also have the following configurations.

[Item 1]

An information processing device including
a processing unit that transmits information requesting retransmission in a coding unit of a first code processed in a second protocol layer higher than a first protocol layer that performs processing related to a second code.

[Item 2]

The information processing device according to item 1,
in which the processing unit performs decoding of the first code on the basis of an encoded symbol of the first code obtained by decoding of the second code, transmits the information requesting retransmission in a case where the encoded symbol of the first code is insufficient, and requests retransmission of the encoded symbol of the first code necessary for decoding of the first code as the information requesting retransmission.

[Item 3]

The information processing device according to item 2,
in which the processing unit judges whether or not the retransmission is necessary on the basis of the number of encoded symbols of the first code for which the decoding of the second code has succeeded or the number of encoded symbols of the first code for which the decoding of the second code has failed.

[Item 4]

The information processing device according to item 2 or 3,
in which the information requesting retransmission includes index information of an encoded symbol for which the retransmission is requested.

[Item 5]

The information processing device according to any one of items 2 to 4,
in which the information requesting retransmission includes the number of encoded symbols for which the retransmission is requested.

[Item 6]

The information processing device according to any one of items 2 to 5,
in which the information requesting retransmission includes index information of an encoded symbol of the first code for which the decoding of the second code has succeeded.

[Item 7]

The information processing device according to any one of items 2 to 6, in which the information requesting retransmission includes the number of encoded symbols of the first code for which the decoding of the second code has failed.

[Item 8]

The information processing device according to any one of items 2 to 7,
in which the information requesting retransmission includes a request for re-encoding, with the first code, all or part of data to be encoded with the first code.

[Item 9]

The information processing device according to item 8,
in which the information requesting retransmission includes information designating a modulation multi-level number of the data.

[Item 10]

The information processing device according to item 8 or 9,
in which the information requesting retransmission includes information designating a symbol size and the number of symbols to encode the data with the first code.

[Item 11]

The information processing device according to any one of items 8 to 10,
in which the information requesting retransmission includes information designating a coding rate at which the data is encoded by the first code.

[Item 12]

The information processing device according to any one of items 8 to 11,
in which the information requesting retransmission includes information designating a coding rate at which the data is encoded by the second code.

[Item 13]

The information processing device according to any one of items 8 to 12,
in which the information requesting retransmission includes information designating an encoding scheme of the first code.

[Item 14]

The information processing device according to any one of items 2 to 13, further including
a communication unit that transmits a first frame including an acknowledgement response of at least one piece of data for which the decoding of the first code has succeeded or failed, and the information requesting retransmission.

[Item 15]

The information processing device according to any one of items 2 to 14, further including
a communication unit that transmits a second frame including information for reserving a first period as a period in which a radio resource used for retransmission of the encoded symbol of the first code is used and the information requesting retransmission,
in which a device that has received the second frame other than a transmission destination device of the second frame refrains from transmission on the radio resource during the first period.

[Item 16]

The information processing device according to any one of items 2 to 15, further including
a communication unit that transmits a third frame including information designating a radio resource to be used for retransmission of the encoded symbol of the first code and the information requesting retransmission.

[Item 17]

The information processing device according to any one of items 2 to 16, further including
a communication unit that receives notification information indicating that retransmission of the encoded symbol of the first code is performed by using all or a part of radio resources allocated to a device different from the information processing device,
in which the processing unit receives the encoded symbol of the first code via all or a part of the radio resources indicated in the notification information.

[Item 18]

The information processing device according to any one of items 1 to 17, further including
a first protocol layer processing unit that performs the decoding of the second code in the first protocol layer,
in which the processing unit performs the decoding of the first code in the second protocol layer.

[Item 19]

The information processing device according to item 18,
in which the second protocol layer is a layer 2 defined in a 3GPP standard.

[Item 20]

The information processing device according to item 18 or 19,
in which the first protocol layer is a MAC layer defined by an IEEE 802.11 standard.

[Item 21]

An information processing method including
transmitting information requesting retransmission in a coding unit of a first code processed in a second protocol layer higher than a first protocol layer that performs processing related to the second code.

REFERENCE SIGNS LIST

11 Macro cell
12 Small cell
13 Macro cell base station
14 Small cell base station
15 Control entity
16 Core network
18 External network
19 HeNB gateway device
20 Gateway device
100 Transmission device
101 Higher layer processing unit
102 First transmission processing unit
103 First FEC encoding unit
104 Second transmission processing unit
105 Second FEC encoding unit
106 Communication unit
108 Antenna
200 Reception device
201 Higher layer processing unit
202 Second reception processing unit
203 First FEC decoding unit
204 First reception processing unit
205 Second FEC decoding unit
206 Communication unit
208 Antenna
300 Computer device
302 Input interface
303 Display unit
304 Communication unit
305 Main storage unit
306 External storage unit
307 Bus

The invention claimed is:
1. An information processing device, comprising
at least one processor that is configured to:
   decode a second code in a first protocol layer;
   obtain at least one first encoded symbol of a plurality of encoded symbols of a first code based on the decoding of the second code, wherein
      the first code is processed in a second protocol layer, and
      the second protocol layer is higher than the first protocol layer:
   determine whether the at least one first encoded symbol of the first code is insufficient to decode the first code;
   transmit information associated with a retransmission request based on the determination that the at least one first encoded symbol of the first code is insufficient, wherein
      the information associated with the retransmission request includes a request for retransmission of the at least one first encoded symbol of the first code which is necessary to decode the first code, and
      the retransmission is requested in a coding unit of the first code processed in the second protocol layer;
   receive the encoded symbol of the first code for which the retransmission request was transmitted; and
   decode the first code in the second protocol layer based on the encoded symbol of the first code.

2. The information processing device according to claim 1, wherein the at least one processor is further configured to determine whether the retransmission is necessary based on a at least one of number of encoded symbols of the plurality of encoded symbols of the first code for which the decoding of the second code has succeeded or a number of encoded symbols of the plurality of encoded symbols of the first code for which the decoding of the second code has failed.

3. The information processing device according to claim 1, wherein the information associated with the retransmission request includes index information of the at least one first encoded symbol for which the retransmission is requested.

4. The information processing device according to claim 1, wherein the information associated with the retransmission request includes a request for retransmission of a number of encoded symbols of the plurality of encoded symbols.

5. The information processing device according to claim 1, wherein the information associated with the retransmission request includes index information of a second encoded symbol of the first code for which the decoding of the second code has succeeded.

6. The information processing device according to claim 1, wherein the information associated with the retransmission request includes a number of encoded symbols of the plurality of encoded symbols of the first code for which the decoding of the second code has failed.

7. The information processing device according to claim 1, wherein the information associated with the retransmission request includes a request for re-encoding, with the first code, all or part of data to be encoded with the first code.

8. The information processing device according to claim 7, wherein the information associated with the retransmission request includes information which designates a modulation multi-level number of the data.

9. The information processing device according to claim 7, wherein the information associated with the retransmission request includes information which designates a symbol size and a number of symbols to encode the data with the first code.

10. The information processing device according to claim 7, wherein the information associated with the retransmission request includes information which designates a coding rate at which the data is encoded by the first code.

11. The information processing device according to claim 7, wherein the information associated with the requesting retransmission request includes information which designates a coding rate at which the data is encoded by the second code.

12. The information processing device according to claim 7, wherein the information associated with the retransmission request includes information which designates an encoding scheme of the first code.

13. The information processing device according to claim 7, the at least one processor is further configured to transmit frame including
   an acknowledgement response of at least one piece of data for which the decoding of the first code has one of succeeded or failed, and
   the information associated with the retransmission request.

14. The information processing device according to claim 1, the at least one processor is further configured to:
   transmit frame including
      information to reserve a first period as a period in which a radio resource used for the retransmission of the at least one first encoded symbol of the first code is used, and
      the information associated with the retransmission request,
   wherein a device, different from a transmission destination device of the frame, that has received the frame refrains from transmission on the radio resource during the first period.

15. The information processing device according to claim 1, the at least one processor is further configured to:
   transmit frame including
      information which designates a radio resource to be used for the retransmission of the at least one first encoded symbol of the first code, and
      the information associated with the retransmission request.

16. The information processing device according to claim 1, the at least one processor is further configured to:
   receive notification information indicating that the retransmission of the at least one first encoded symbol of the first code is performed by using all or a part of radio resources allocated to a device which is different from the information processing device; and
   receive the at least one first encoded symbol of the first code via all or the part of the radio resources indicated in the notification information.

17. The information processing device according to claim 1, wherein the second protocol layer is a layer 2 defined in a 3GPP standard.

18. The information processing device according to claim 1, wherein the first protocol layer is a MAC layer defined by an IEEE 802.11 standard.

19. An information processing method, comprising:
   decoding a second code in a first protocol layer;
   obtaining at least one first encoded symbol of a plurality of encoded symbols of a first code based on the decoding of the second code, wherein the first code is processed in a second protocol layer, and the second protocol layer is higher than the first protocol layer:

determining whether the at least one first encoded symbol of the first code is insufficient to decode the first code;

transmitting information associated with a retransmission request based on the determination that the at least one first encoded symbol of the first code is insufficient, wherein the information associated with the retransmission request includes a request for retransmission of the at least one first encoded symbol of the first code which is necessary to decode the first code, and the retransmission is requested in a coding unit of the first code processed in the second protocol layer;

receiving the encoded symbol of the first code for which the retransmission request was transmitted; and decoding the first code in the second protocol layer based on the encoded symbol of the first code.

* * * * *